Sept. 4, 1951 W. A. HUBER ET AL 2,566,331

RADAR RANGE TRACKING SYSTEM

Filed Oct. 19, 1943 8 Sheets-Sheet 1

INVENTORS
WILLIAM A. HUBER &
WILLIAM T. POPE JR.

BY William D. Hall
Attorney

RADAR RANGE TRACKING SYSTEM

Filed Oct. 19, 1943 8 Sheets-Sheet 2

INVENTORS
WILLIAM A. HUBER &
WILLIAM T. POPE JR.

BY William D. Hall.
Attorney

INVENTORS
WILLIAM A. HUBER &
WILLIAM T. POPE JR.
BY William D Hall
Attorney

RADAR RANGE TRACKING SYSTEM

Filed Oct. 19, 1943 8 Sheets-Sheet 4

INVENTORS
WILLIAM A. HUBER &
WILLIAM T. POPE JR.
BY William D. Hall
Attorney

RANGE OSCILLOSCOPE SCREENS.

AZIMUTH OR ELEVATION OSCILLOSCOPE SCREENS.

INVENTORS
William A. Huber
William T. Pope, Jr.
BY William D. Hall.
Attorney

RADAR RANGE TRACKING SYSTEM

Filed Oct. 19, 1943

INVENTORS
WILLIAM A. HUBER &
WILLIAM T. POPE JR.

BY William D. Hall.
Attorney

INVENTORS
WILLIAM A. HUBER &
WILLIAM T. POPE JR.
BY William D. Hall
Attorney

INVENTORS
WILLIAM A. HUBER &
WILLIAM T. POPE JR.
BY William D. Hall
Attorney

Patented Sept. 4, 1951

2,566,331

UNITED STATES PATENT OFFICE 2,566,331

RADAR RANGE TRACKING SYSTEM

William A. Huber, Neptune City, and William T. Pope, Jr., Asbury Park, N. J.

Application October 19, 1943, Serial No. 506,808

3 Claims. (Cl. 343—7)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to radio pulse-echo object-locating systems, and more particularly to a method and apparatus for automatic tracking and automatic ranging of a single moving object by means of the radio pulse-echo object locating systems.

In the systems of this type, a pulse of radio-frequency energy is radiated by a highly directional antenna. If the transmitted wave strikes an object capable of reradiating these waves, they will be reflected, in part, back to their source by this object. This echo pulse on its return to its source has sufficient energy to produce an observable effect in a suitable receiver located in the vicinity of the original source of radio energy. Generally the effect consists of visual indications on a cathode-ray oscilloscope in a form of vertical peaks projecting upward from a horizontal base-line. These visual indications, together with the positioning of the antennae, are utilized for determining the location of the object.

Under certain conditions a complete reliance on the data as obtained by the operators of the radio systems of this type based on manual adjustments of controls for manual tracking with elevation and azimuth antenna arrays unjustifiably limits the possibility of these systems by lowering their accuracy. The vertical peaks produced by the echo signals may vary in their amplitude from one instant to another because of the fluctuations in the intensity of the reflected signal, intereference signals which may add to or subtract from the echo signals, variations in the transmission medium and the resulting variations in strength of the reflected pulse, and because of other causes which need not be discussed here. Moreover, the signal pattern as it actually appears on the oscilloscope screen generally includes a large number of echo signals proper as well as a multitude of pulsating signals, commonly called "noise." Another factor which must be considered relates to the illumination generally found on the oscilloscope screen. Compared with daylight, this illumination is low, and when the equipment is used in the daytime there is a very marked contrast in light intensities found on the oscilloscope screen and bright surroundings. This contrast sometimes produces a temporary blindness among operators due to quick changes from light to dark and vice versa.

All of these effects tend to tire the operators, strain their eyes, and make them non-responsive to small changes in the intensities of the echo signals on the oscilloscope screen. This, added to the normal human error which increases very rapidly under combat conditions, causes the operators to make relatively large errors in azimuth and elevation determinations.

Since these errors are attributable solely to the manual operation of the system, no advantage is obtained by increasing the accuracy of the radio system itself because high precision of the system itself is completely submerged in the comparatively large errors committed by the operators during manual operation of the controls. Therefore, if the increased precision of the radio system itself it to be reflected in the final data obtained with the aid of this system, the errors produced by the operators must be eliminated. The most direct method of accomplishing this result is by eliminating this source of errors altogether. This may be done by transferring some of the duties of the operators at a predetermined stage of normal operating cycle of radio locator to an automatic equipment, the performance of which would excel the manual operation of controls by the operators, and would thus enable one to obtain that limit of accuracy which is imposed only by the system itself.

In our application for patent entitled "Radio Object Locating System" Serial No. 478,862, filed in the United States Patent Office on March 12, 1943, we disclosed an automatic antenna tracking system for the so-called synchronous radio locator, the synchronous operation of the transmitter and receiving channels of which is under control of a common synchronizing oscillator. The invention disclosed in this specification provides an automatic tracker for a self-synchronous radio locator where synchronous operation of the receiver channel is under control of the keying or transmitted pulse rather than the synchronizing oscillator, and an automatic ranger for both types of radio locators, i. e. for the synchronous as well as the self-synchronous radio locators. The automatic ranger for the synchronous radio locator may be considered, therefore, as being complementary to the invention disclosed in our patent application Number 478,862, since, in order to make the entire radio object-locating system function automatically, automatic ranging as well as automatic tracking is necessary.

It is, therefore, the principal object of this invention to provide a motor driven equipment for automatic range determination of a moving object for the synchronous and the self-synchronous radio locators.

It is another object of this invention to provide an automatic tracker for the self-synchronous radio locator.

Still another object of this invention is to provide the necessary circuits between the synchronous radio locator and the automatic ranger so that the two could function as a single unit when it is so desired.

Still another object of this invention is to provide the circuits between the self-synchronous radio locator and the automatic ranger and tracker so that the entire system could be made to follow automatically and faithfully a single moving echo-producing object.

Still another object of this invention is to devise a driving and switching equipment which would perform the intended function with high degree of accuracy, simplicity and operating flexibility.

Still another object of our invention is to provide the circuits between the automatic ranger and a range oscilloscope for indicating proper functioning of the automatic ranger on the screen of the range oscilloscope by means of a marker signal which identifies an echo signal followed by the automatic ranger.

Still another object of our invention is to provide the circuits for the self-synchronous system which enable the azimuth and elevation oscilloscope operators to reproduce on the screens of their oscilloscopes either a single echo signal selected by the range operator or the entire range field of the system.

The novel features which we believe to be characteristic of our invention are set forth with particularity in the appended claims. Our invention itself, however, both as to its organization and method of operation, together with the further objects and advantages thereof, may best be understood by reference to the following description taken in connection with the accompanying drawings in which:

Figure 9:
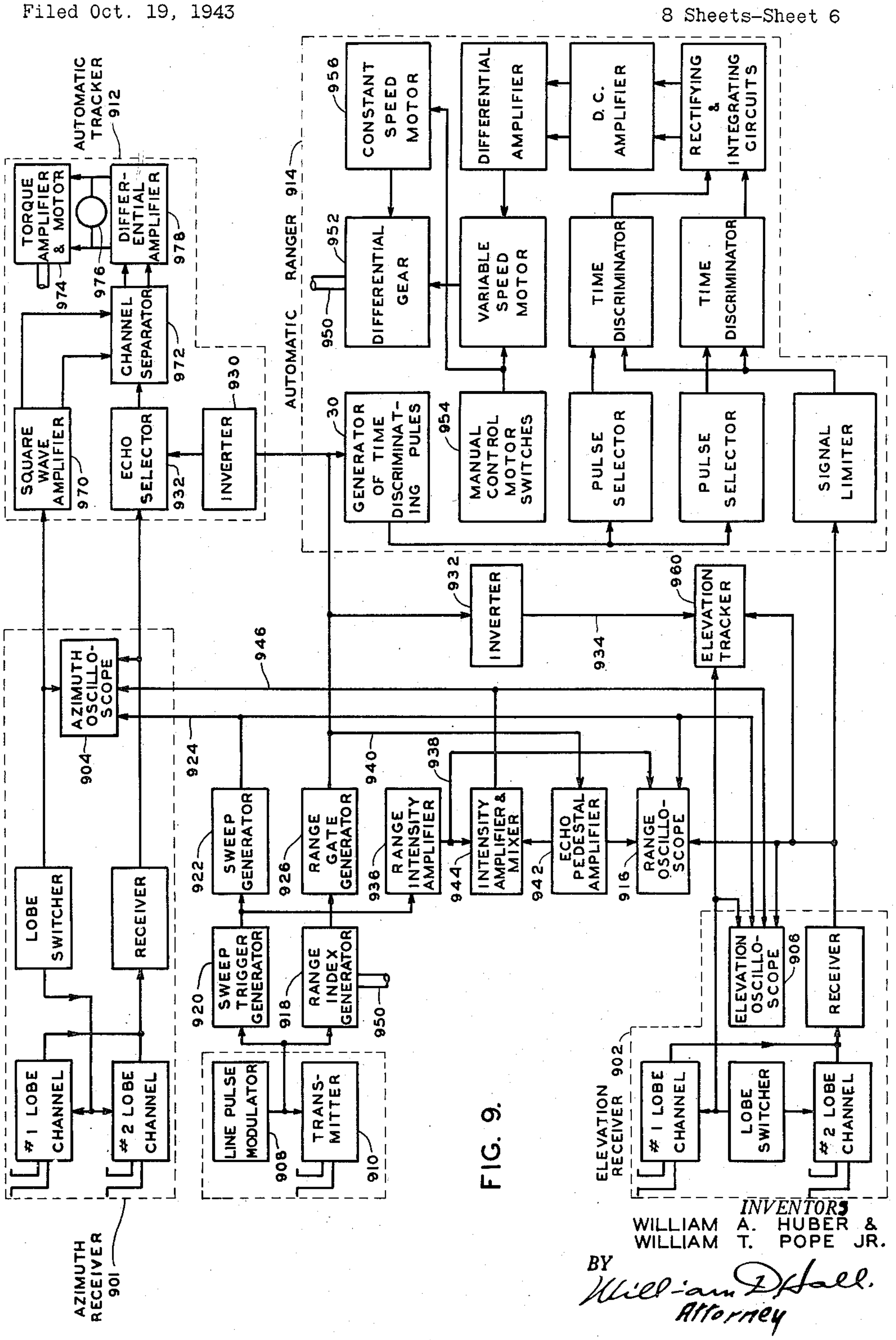
Figure 12:
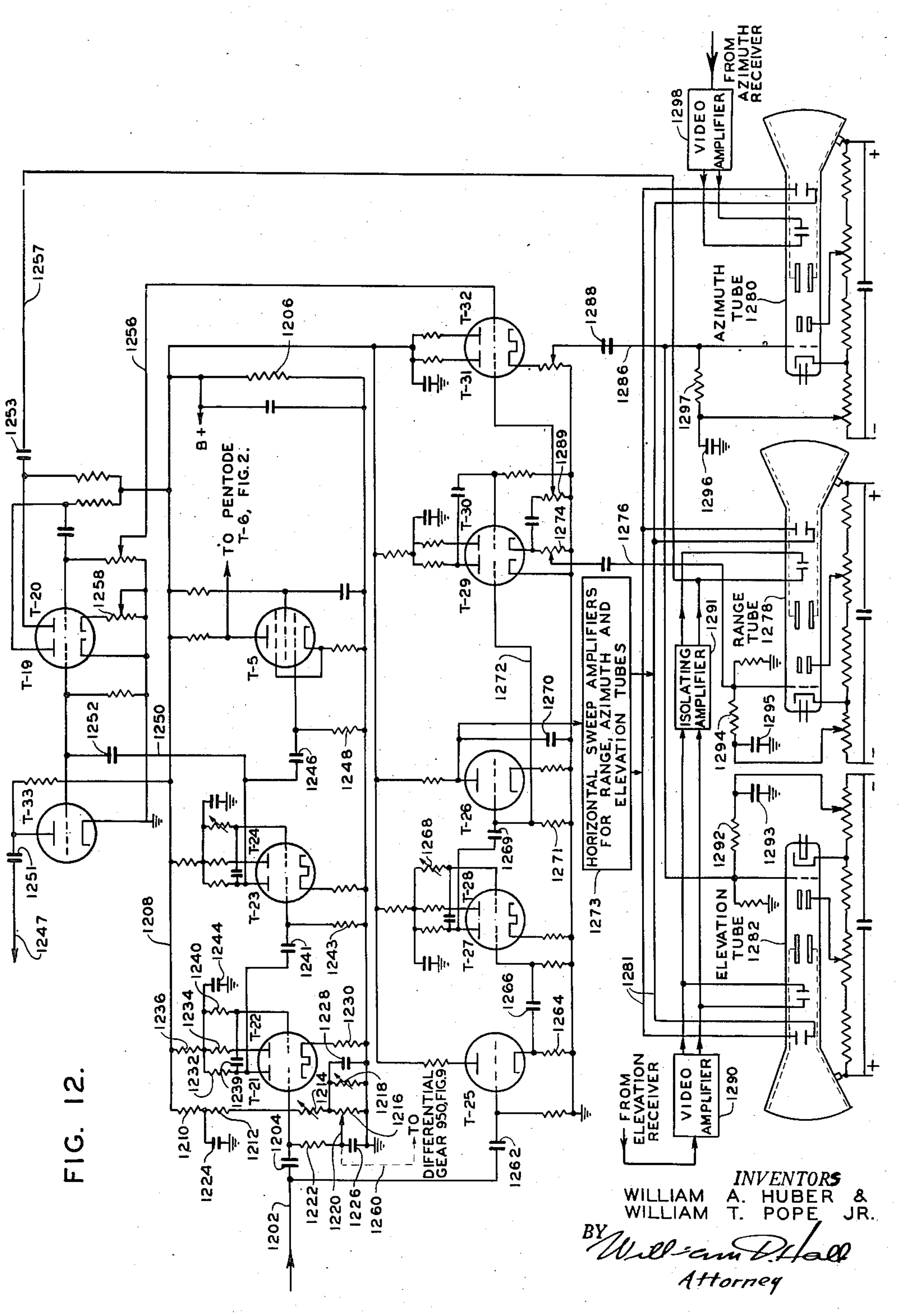
Figure 13:
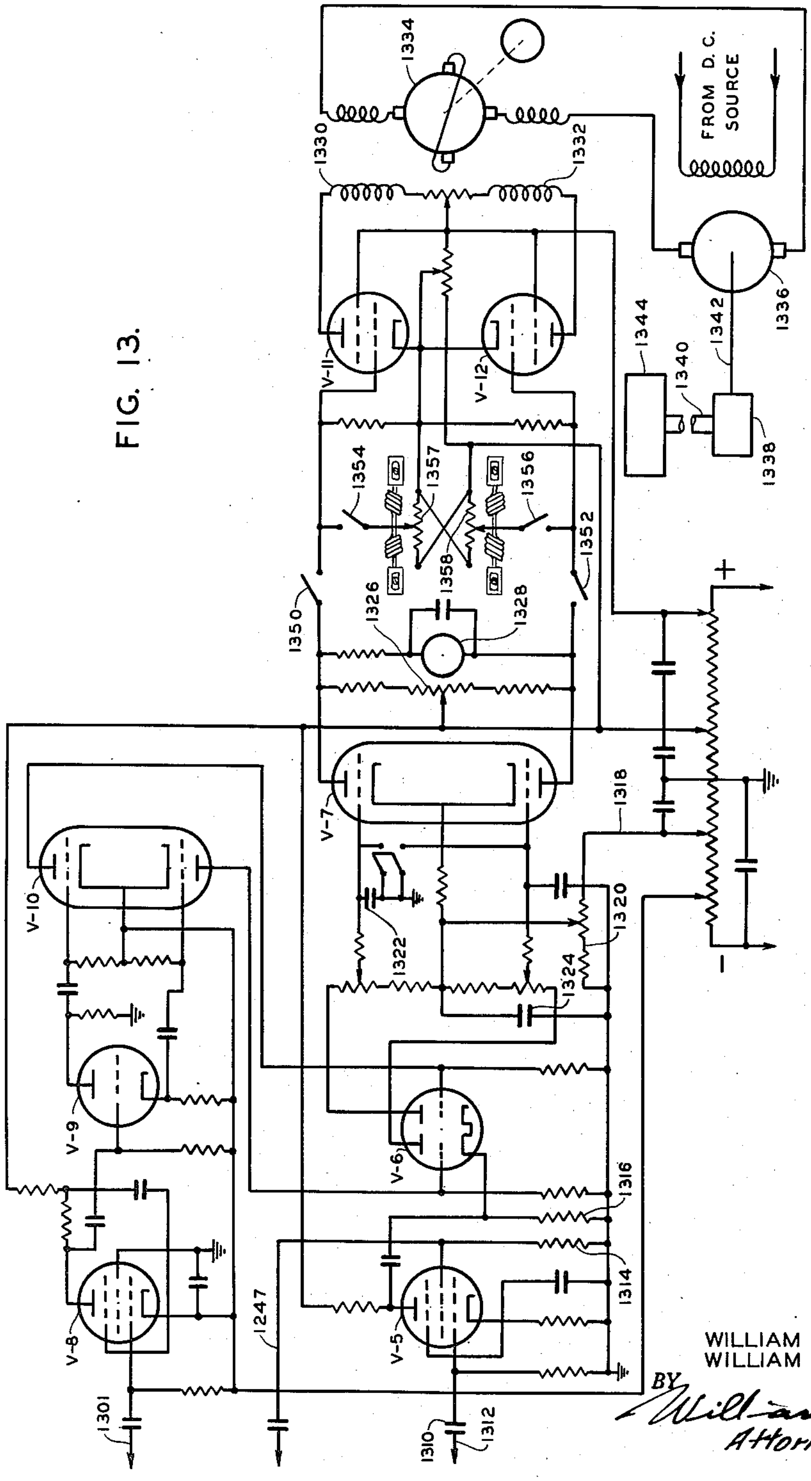

Figures 3 to 8, 10, and 11 are figures used to aid the understanding of the invention;

Figure 9 is a block diagram of the self-synchronous radio locator and automatic tracker and ranger;

Figure 12 is a schematic diagram of circuits interconnecting the self-synchronous locator and the automatic tracker and ranger; and Figure 13 is a schematic diagram of the automatic tracker for the self-synchronous radio locator.

*Classification of the radio object-locating systems*

Before proceeding with the description of the specific automatic tracking and ranging systems disclosed in this application, for the sake of clarity of the disclosure, a broad present-day classification of the radio object-locating systems and the requirements which must be satisfied by the automatic followers will be given first. This will be followed by the description of the radio object-locating system using the synchronizing oscillator and of the automatic ranger connected to it, the two being adapted to function as a single operating unit when ranging of a moving object is transferred to the automatic ranger. It will be concluded with the description of the system using the keying or the transmitted pulses for synchronizing the operation of the receiver, and automatic operation of such system.

The two broad classes of the radio object-locating systems are as follows: one class uses a synchronizing oscillator for controlling the operating periods of the transmitting and the receiving channels, this oscillator keeping the two channels constantly in the strictest synchronism. This type of system is sometimes called a synchronous system, previously mentioned in this specification. In the second class of systems, the synchronizing oscillator may be absent altogether and the synchronous operation of the receiving channels depends in this case either on the keying or the transmitted pulses. The latter class of systems is called the self-synchronous systems. They ordinarily use the "slave-sweep" or "servo-sweep" circuits and spark keyers.

Figure 1:
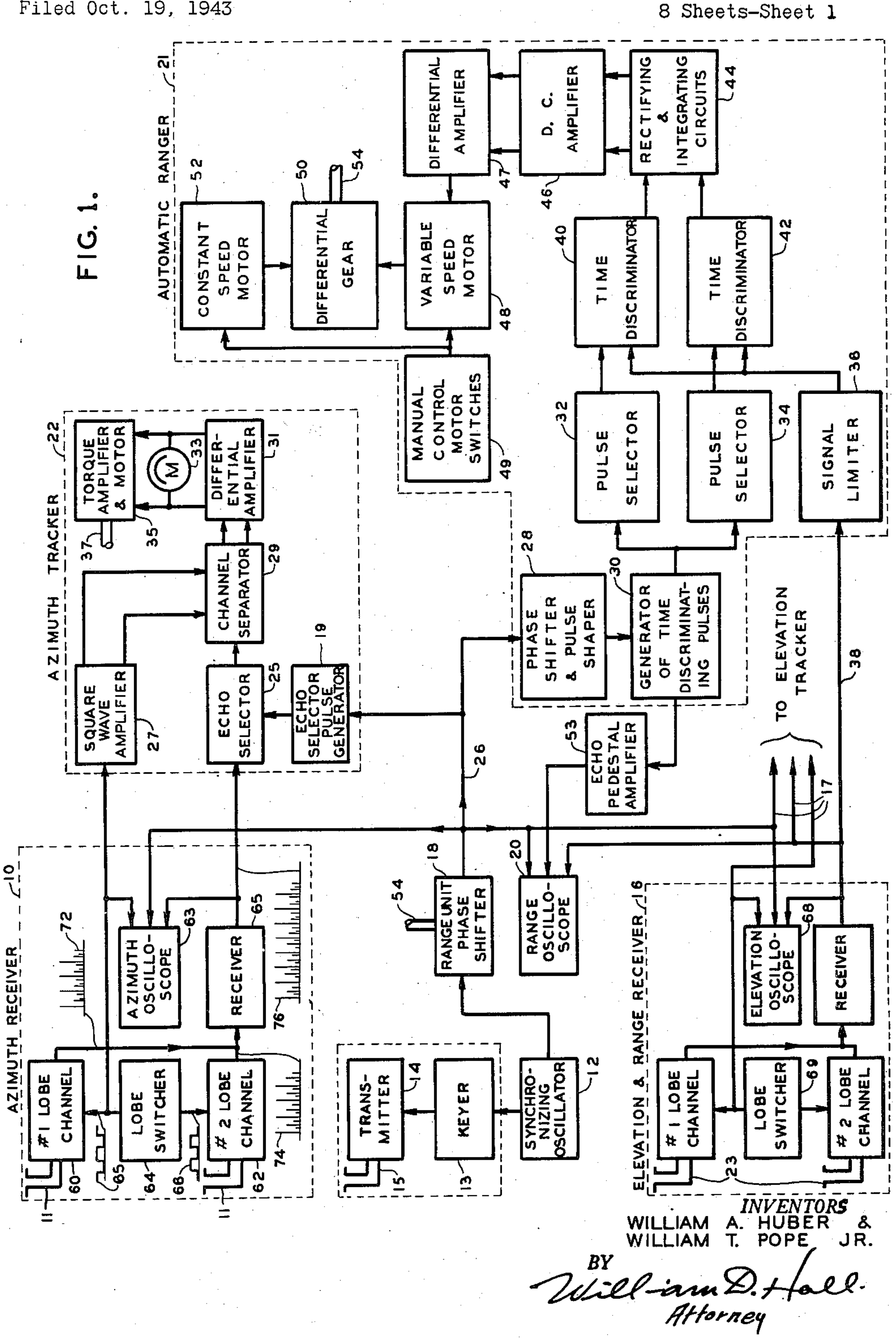
Figure 1 is a block diagram of the synchronous radio object-locating system and a block diagram of the automatic tracker and automatic ranger connected to the locator.

The invention relates to both classes of the radio object-locating systems. Figure 1 is a block diagram of the radio object-locating system of the first class, i. e. the synchronous system, and connections between such a system and the automatic tracker and ranger, while Fig. 9 discloses a block diagram of a system of the second class, i. e. the self-sychronous system, and connections between this type of system and the automatic tracker and ranger.

*Double tracking method of reception*

In the radio object-locating systems under consideration the echo signals are received by an antenna array having two divergent, partially over-lapping-response lobes, one of these lobes being connected to one receiver channel and another lobe being connected to the other receiving channel, these channels being keyed by a lobe switcher so that there is first a series of echo signals as they are received over one antenna lobe and one receiver channel, and then a series of echo signals of like duration as they are received over the other antenna lobe and the other receiver channel. If the antenna is properly oriented with respect to any given object, the intensity of the echo signals produced by this object in the two channels will be equal. This is true with respect to the azimuth as well as the elevation channels since both channels utilize the principles outlined above. Therefore, the automatic tracking system which is suitable for the azimuth tracking is equally suitable for the automatic tracking in elevation. This being the case, a description of only one system is necessary.

Figure 7:
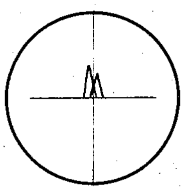
Figure 8:
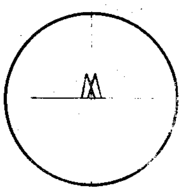

The radio object-locating systems which employ an antenna array with two divergent, overlapping response lobes, and a like number of receiver input channels connected to the output circuits of the antenna lobes, and alternately operating to receive a series of signals from an object first through one of said channels and then through the other, and which use these channel signals to provide two adjacent visual signals which may be easily compared with respect to the relative magnitude, and thus used for the purpose of orientation of the system in azimuth and in elevation, are known as the double-tracking systems. Such a system is disclosed in block diagram form in the left portion of Fig. 1 and in somewhat more detail in the application for the United States patent of James R. Moore, Serial No. 467,266, filed on November 28, 1942, and entitled "Double Tracking Means for Pulse-Echo Systems." The signals produced in such systems are illustrated in Figs. 7 and 8 where the two channel components of an echo signal reradiated by a single object are shown as they normally appear on the screens of the azimuth and elevation oscilloscopes.

*Operating requirements of the automatic tracker and ranger*

*Automatic tracker.*—Apparatus for the automatic tracking described in our patent application Serial No. 478,862 is adapted to operate with the synchronous system. The automatic tracker disclosed here is particularly adapted to function with the self-synchronous double tracking radio object-locating systems. If one is to disregard some of the necessary auxiliary equipment and connections between the automatic tracker and two classes of the radio locators considered, this auxiliary equipment and connections differing considerably from each other, and consider the basic circuits of the automatic tracker alone, then, irrespective of the type of system to which it is connected, in order to automatically track a single moving object, the automatic tracker must satisfy the following common requirements: the first requirement resides in the provision of some means for the selection of the desired echo signal and elimination of all other signals which may be present in the output circuits of the receiver. Since, as a rule, there is a plurality of the objects producing an echo signal within the field of the antenna, and since the receiving antenna also receives the transmitted signal, it then follows that in order to automatically track a single moving object, it is necessary to eliminate the transmitted signal and all other echo signals from the output circuits of the automatic tracker to accomplish the desired result.

The second requirement for the automatic tracker used with the double-tracking system resides in the provision of a circuit capable of separating the channel components of the selected echo signal so that the channel No. 1 components appear once more in an independent circuit, and the channel No. 2 components appear in the other independent circuit. This is necessary so that the channel components of the selected echo signal may be impressed, after proper linear amplification, on a differential circuit capable of comparing the amplitude of the channel components of the selected echo signal.

The third requirement for the automatic tracker suggests itself at once from what has been said about the second requirement. The parallel channels of the automatic tracker must terminate in a differential circuit which would be capable of comparing the amplitude of the channel components, this comparison resulting in a reversible-direct current proportional to the difference in the amplitude of the channel components.

Finally the automatic tracker must provide a torque amplifier terminating in a power-driven mechanism connected to the antenna array mount, the power drive being capable of responding to the reversible-direct current voltage of the torque amplifier so as to automatically turn the antenna mount in the direction which would equalize the intensities of the channel components of the selected echo signal.

The automatic trackers described in this specification have the elements which satisfy the enumerated requirements.

*Automatic ranging systems.*—The automatic rangers described in this specification are illustrated in connection with the radio object-locating system where the range is determined by measuring time which elapses between the transmission of an exploratory pulse and the reception of an echo signal by using electrical oscillations for measuring this time.

In the system illustrated in Fig. 1 these measurements are made by means of a phase shifter which enables one to position the desired echo signal under a hair line on the screen of the range oscilloscope or to position it in a notch or any other appropriate marker appearing on the screen of the range oscilloscope, the lateral position of which is made to coincide with the desired echo signal of the range oscilloscope.

In Fig. 1 this is accomplished by shifting the phase of the sinusoidal wave which controls the timing of the range oscilloscope saw tooth oscillator. By varying the timing or the beginning of the saw-tooth wave with respect to the transmitted signal which results in positioning of the echo signal under the hair line, the time interval between the transmission of a pulse and the reception of its echo is measured. In the synchronous systems, the sinusoidal wave is generated by the synchronizing oscillator, while in the self-synchronous system either the transmitted signal or the keying voltage is used to accomplish the same purpose. In either system, the final range determination is accomplished by measuring the time interval between the transmission of exploratory pulse and the reception of an echo signal which is accomplished by means of a phase shifter in one system, and by means of a potentiometer in the second system. In both systems the phase shifter and the potentiometer are calibrated directly in miles, yards or other linear units.

Since range determination depends on the measurement of the aforementioned time interval, and it does not depend upon the differences in the intensities of the lobe components of the echo signal, apparatus for automatic ranging differs from the apparatus for automatic tracking.

Whether the radio object-locating system is of the synchronous or self-sychronous type, the automatic ranging systems disclosed in this specification possess the following common features.

As in the case of the automatic tracking system, there is an echo selecting circuit which selects the desired echo signal and eliminates all other signals.

However, since the function assigned to the automatic ranger resides in the fact that it must keep the selected echo signal constantly under the cross hair line on the screen of the range oscilloscope, or in the notch, or have the marker under the selected echo, the automatic ranger at this stage must assume a different form than the same circuit for the automatic tracker. To accomplish this, the automatic ranger provides two parallel channels which become unbalanced when the selected echo signal begins to drift in either direction on the range oscilloscope screen. To obtain this result the automatic ranger provides a time-discriminating signal for each channel having a fixed time relationship with respect to the output of the range unit. When the range unit follows the object, the two parallel channels of the automatic ranger are equally conductive. When the selected echo signal begins to drift to the left or to the right with respect to the time-discriminating signals, which happens when the object changes its range position, then one channel is rendered more conductive, and another channel is rendered less conductive.

The remaining elements of the automatic ranger may be similar to the corresponding elements in the automatic tracker, i. e. the outputs of the two parallel channels are connected to an appropriate differential circuit, the output of which is connected to a motor driven system used for rotating the phase shifter in the synchronous system or for adjusting the potentiometer in the self-synchronous system in such a manner as to keep the selected echo signal constantly in proper relationship with respect to a reference marker which results in automatic range determination.

*Double-tracking radio object-locating systems with synchronizing oscillator*

Figure 1 shows a block diagram of the radio object-locating system using the double-tracking antenna array, and a synchronizing oscillator. The disposition of elements in Fig. 1 is as follows: an azimuth receiver 10 is illustrated in the upper left corner of the diagram, a synchronizing oscillator 12 and a transmitting channel consisting of a transmitter 14 and a keyer 13 are directly below the azimuth receiver 10, and an elevation and range receiver 16 is in the lower left corner of the diagram. A range unit 18 and a range oscilloscope 20 are shown to the right of synchronizing oscillator 12. These components comprise the synchronous radio locator, and the remaining elements also shown in this figure relate to the automatic tracker and ranger.

An azimuth tracker illustrated at 22 includes pulse generator 19 operating echo selector 25 to pass echo pulses only during an interval corresponding to the distance of the object being tracked, amplifier 27 operating channel separator 29 by the lobe switch voltage to separate such echo pulses passed by selector 25 according to the antenna lobe over which received and produce a variable reversible voltage by the relative values of said separated pulses, and amplifier 31 responsive to such voltage to operate indicator 33 and also torque amplifier and motor 35 to turn the antenna until the two lobes provide equal pulses. This has been more fully disclosed in our application No. 478,862. In the above mentioned application for patent, it has been stated that the automatic trackers for the azimuth and elevation antenna arrays are identical in all respects, and for that reason the description of only one tracker has been given. This is equally true in this case, and the elevation tracker, therefore, is not illustrated in Fig. 1, but three conductors 17 appearing immediately to the right of elevation and range receiver 16 are illustrated as leading to the elevation tracker. The block diagram of the automatic ranger 21 appears directly to the right of the elevation and range receiver 16, and it represents that complementary component for rendering the entire system completely automatic that is disclosed in this specification and forms one of the objects of this invention.

Reverting now to a brief description of the operation of the radio locator itself, synchronizing oscillator 12 is connected to keyer 13 which modifies the sinusoidal wave impressed upon it into a periodic series of powerful pulses of very short duration. These pulses are used for keying transmitter 14 which emits correspondingly short, powerful and highly directional pulses through a highly directional antenna array 15. If there are any objects within the field of antenna 15 that are capable of reradiating the transmitted pulse, it will be reradiated by these objects, and some portion of the reradiated energy will reach antenna arrays 11 and 23. Each of these arrays has two divergent, partially overlapping highly-directional polarized reception patterns so that the reflected echo signal will induce two signals of equal intensity when the mean axis of the array is pointed directly at the object, and of unequal intensity when the array forms an angle with the plane of the incoming radio wave.

The antenna arrays of this type are known, and do not form a part of our invention; therefore, their description need not be given here. It should be stated, however, that our invention is not restricted to any particular antenna system, and will function with any type of directional antenna array which has at least two divergent, partially overlapping polarized reception patterns capable of producing two signals of equal or unequal intensity, depending upon the orientation of the mean axis of the array with respect to the plane of the incoming radio wave.

The radio object-locating system illustrated in Fig. 1 is used for determining the azimuth, elevation and range of the object. As illustrated in Fig. 1, the range determining channel, as a rule, has no separate antenna array, and may be connected either to the azimuth or the elevation channel. It is connected to the elevation channel in Fig. 1.

Figure 5:
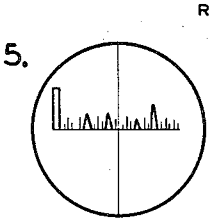
Figure 6:
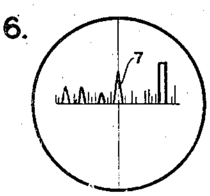

A signal from one lobe of the antenna is impressed on a radio frequency amplifier illustrated as a number 1 lobe channel 60, and from the other lobe on a radio frequency amplifier or a number 2 lobe channel 62, the two R. F. amplifiers forming two parallel input channels of receiver 10. The signals in these radio frequency channels will be composed of the main transmitted pulse, one or more echo signals, if there are any echo-producing objects within the antenna field, and of interference signals. This is shown in Figs. 5 and 6 which illustrate a range oscilloscope screen with a typical signal pattern appearing on the screen.

As stated above, the amplitude of the echo signals in the R. F. channels may or may not be equal, and this amplitude difference is utilized as a guide for proper orientation of the azimuth and elevation antenna arrays. A typical single-echo signal pattern as it appears on the elevation or azimuth oscilloscope screens is illustrated in Figs. 7 and 8. Normally, all signals appearing on the screen of the range oscilloscope also appear in the same time relationship on the screens of the azimuth and the elevation oscilloscopes; for the sake of clarity only one selected echo signal is illustrated in Figs. 7 and 8. Fig. 7 illustrates the channel components when they have unequal intensities, and Fig. 8 illustrates them when they are made equal by pointing the mean axis of the antenna array directly at the echo-producing object.

To produce these two independent images of the same echo signal on the screen of an azimuth oscilloscope 63, the lobe channels 60 and 62 are keyed by a lobe switcher 64 which generates rectangular waves 65 and 66 of the same frequency but 180° out of phase; these waves make the lobe channels 60 and 62 alternately conductive so that the output signals of the respective channels are as illustrated at 72 and 74, the highest peaks indicating the transmitted pulse and the smaller peaks indicating the echoes.

The lobe switcher frequency may be synchronized by well known means with the frequency of the synchronizing oscillator 12, and made any sub-multiple of the oscillator's frequency. If the lobe switcher frequency does not have any sub-multiple or multiple relationship with the frequency of the oscillator, then it must be sufficiently removed from the frequency of the oscillator to avoid the production of undesired patterns on the oscilloscope screens. In the system of Fig. 1 the frequency of the lobe switcher is four times lower than the frequency of synchronizing oscillator 12, since four complete channel components of the received signals are shown at 72 and 74.

The lobe channels 60 and 62 are connected to a receiver 65 which transforms the radio frequency signals into video signals and impresses them on an azimuth oscilloscope 63 and on an azimuth tracker 22. The signals on the output side of the receiver are illustrated at 76; they consist of a continuous series of four signals first from one lobe and then from the other lobe.

Elevation and range receiver 16, with the exception of the orientation of the plane of the two antenna lobes, is identical in all respects to azimuth receiver 10, and, therefore, need no additional description. The output of elevation and range receiver 16 is connected to an elevation oscilloscope 68, automatic ranger 21, range oscilloscope 20, and the elevation tracker, the latter not being shown in the figure.

The sweep voltages of the azimuth, elevation and range oscilloscopes are under control of synchronizing oscillator 12 to which they are connected through a range unit phase shifter 18. Since the synchronizing oscillator 12 also controls transmitter 14, the sweep circuits of the range, azimuth, and elevation oscilloscopes are in constant synchronism with the transmitted pulse, and there is a fixed time relationship between the reproduced signals on all oscilloscope screens. Therefore, the range unit operator may shift simultaneously the lateral position of the entire field on the screens of the azimuth, range, and elevation oscilloscopes by means of phase shifter 18. Moreover, the horizontal plates of the azimuth and elevation oscilloscopes 63 and 68 are also under control of the rectangular waves generated by the lobe switchers 64 and 69 which produce horizontal separation between the lobe components of the echo signals illustrated in Figs. 7 and 8.

Since range oscilloscope 20 is connected only to elevation receiver 16 and phase shifter 18, and is not connected to either of the lobe switchers, the lobe components of the echo signal are not imparted any horizontal separation on the screen of the range oscilloscope, and, therefore they are directly superimposed upon each other when the amplitudes of the lobe components are equal and appear directly under each other if there is any difference in their amplitudes. Figs. 5 and 6 illustrate that condition when the amplitudes are equal; the signals appear, therefore, as a single trace line.

For more detailed descriptions of suitable types of transmitter 14 and keyer 13, reference is made to the application of James R. Moore, Serial No. 467,268 and 467,269, both filed November 28, 1942, now Patent Numbers 2,464,252 and 2,462,885; John W. Marchetti, Serial No. 477,782, filed March 3, 1943, and Melvin D. Baller, Serial No. 477,103, filed February 25, 1943, now Patent Number 2,497,854. For details of circuits suitable for use in the azimuth, range and elevation oscilloscope sweep channels, and phase shifters suitable for use in the range unit phase shifter 18 reference is made to Signal Corps Manuals TM 11—1106 of August 1942 or TM 11—1106—B of July 1943.

The term echo as used in this specification is not to be restricted to signals which are reflected or reradiated by any object. This term is also used to signify any response to a signal such as the one obtained by means of a normally inoperative transmitter located on an object which when keyed by the transmitted pulse automatically sends an answering pulse either on the same or different frequency.

The operation of the system is, briefly as follows: oscillator 12 controls keyer 13 in such a manner that the latter keys transmitter 14 with a constant predetermined periodicity, this periodicity being controlled by the frequency of the oscillator. Transmitter 14 emits, through a highly directional antenna array 15, short periodic pulses which constitute the field exploring signals. If there is a plurality of echo-producing objects within the antenna field, their echoes will appear on the range, azimuth, and elevation oscilloscopes as a plurality of peaked signals. To determine the distance to any one of these objects, the range oscilloscope operator revolves a hand wheel of phase shifter 18 until the selected echo signal appears under the hairline of range oscilloscope 20, as illustrated in Figs. 5 and 6, where Fig. 5 illustrates the relative position of the signals with respect to the hair line before any echo signal has been selected, and Fig. 6 illustrates the same signals but with an echo signal 7 selected by the range oscilloscope operator. The phase shifter has a correctly calibrated dial which gives range distance in miles or yards, its reading being zero when the transmitted pulse is under the hair line on the screen of the range oscilloscope. Operation of phase shifter 18 also shifts the echo signals on the screens of the elevation and azimuth oscilloscopes and positions the echo signal selected by the range operator in the center of the screens of these oscilloscopes, as illustrated in Figs. 7 and 8. This at once gives notice to the azimuth and elevation operators which particular signal has been selected, and they properly orient the mean axis of their antennae with respect to that particular echo signal. If the echo signals are of different magnitude, as illustrated in Fig. 7, the azimuth and elevation operators turn the antenna mounts either manually or through power drives so as to point their antennae directly at the object. This equalizes the amplitudes of the echo components on the oscilloscope screens, as illustrated in Fig. 8. The azimuth and elevation angles necessary for locating the object appear on the dials connected to the antenna mounts. As thus far described, the system is conventional, and forms a part of this specification only for the purpose of describing one typical system to which the present invention is applicable.

*Automatic ranger, Fig. 1.*—Since automatic ranger 21 as the term suggests it, represents a complementary component for the ranging apparatus of the radio locator, for the sake of clarity of this disclosure, a brief review of the basic principles of operation of the ranging equipment will be given first, and it will be followed with the description of the automatic ranger.

The ranging apparatus of the radio locator is composed primarily of synchronizing oscillator 12, range unit phase shifter 18, and range oscilloscope 20. The function assigned to this equipment consists of receiving the reflected signals, and measuring the time elapsing between the transmission of the exploratory pulse and the reception of an echo signal. The time of reception of the echo signal, as indicated on the screen of the range oscilloscope by lateral spacing between the transmitted signal and the echo signal, gives a measure of the elapsed time, and, because of the known velocity of propagation of the radio waves, it may be converted into the measurement of distance.

Since a phase shift may be considered as a time delay, the actual time interval between the transmitted pulse and the echo from an object is measured by the range unit phase shifter calibrated in yards. In order to eliminate confusion which would arise if successive patterns of transmitted echo signals were permitted to overlap on the oscilloscope screen, the pulse rate for the exploratory signals is selected so that the most distant echo normally received from a particular outgoing pulse has returned before the succeeding outgoing pulse is transmitted. The measurement of the time interval between the transmitted pulse and the received echo signal is accomplished by means of a calibrated phase shifter in the range unit by first aligning the transmitted pulse with a fixed position represented by a hairline on the range oscilloscope screen, setting the phase shifter dials to zero, aligning the echo signal with the same hairline, and observing the phase shifter dial setting which indicates distance in yards.

The alignment of the signals with the hairline on the range oscilloscope is actually accomplished by impressing the sine wave voltage generated by the synchronizing oscillator on the phase shifter, and by using its output for controlling the firing of the saw-tooth sweep circuit of the oscilloscope so that the echo pattern from the receiver can be moved across the screen.

From the above description of the principles of operation of the range unit, it follows that if the object producing echo signal approaches the radio locator, the time elapsing between the transmission and the reception will be constantly decreasing, and if the echo signal is to be in a fixed position on the screen of the range oscilloscope, the firing of the saw-tooth oscillator used for producing the base line on the screen of the range oscilloscope must be constantly advanced. This is accomplished by constantly advancing the phase of the sinusoidal wave voltage on the output side of the range unit, this change in phase corresponding to the change in range of the echo-producing object. The same is true when the echo-producing object recedes from the radio locator, except that in this case the phase shift is obviously in the opposite direction to that when the object is approaching.

If one is to devise some system which would be capable of automatic ranging, such systems must utilize the principle based upon the phase relationship between the echo signal and the sinusoidal voltage appearing on the output side of the range unit. A system of this kind should be capable of generating two time-discriminating signals which would electrically indicate the phase condition of the sinusoidal voltage in the automatic ranger with the echo signal appearing between the time-discriminating signals, or in such relative time relationship with respect to the time-discriminating signals, that when the radio locator is "on range," no motor driving voltage is generated by the automatic ranger, this voltage being generated only when the time relationship between the time-discriminating signals and the echo signal changes.

Figure 4:
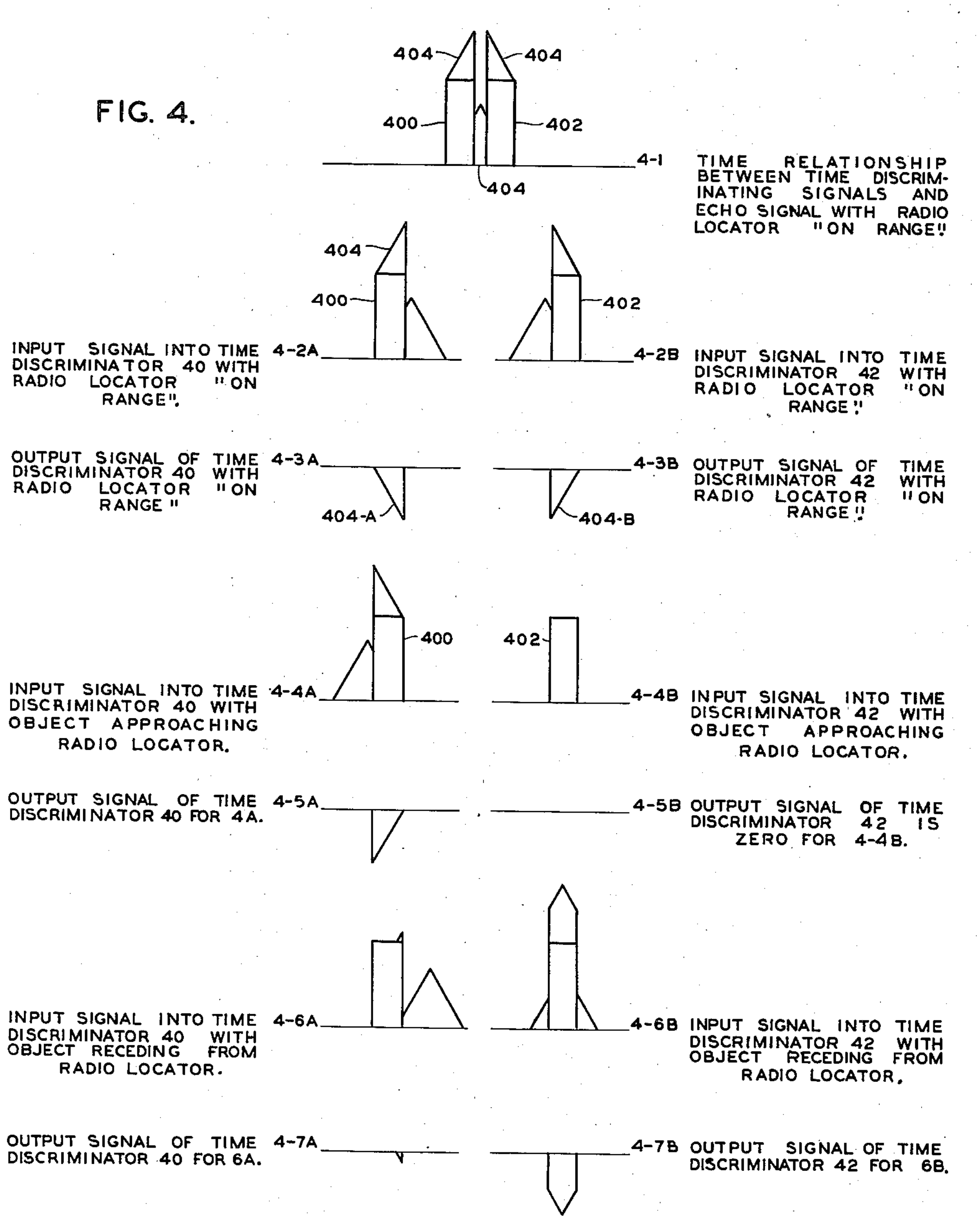

This is illustrated in Fig. 4 where 400 to 402 illustrate two time-discriminating signals which are used in the automatic ranger for electrically indicating the timing, or phase condition of the sinusoidal wave on the output side of phase shifter 18, or to paraphrase it more directly, which electrically indicate in the automatic ranger the setting of phase shifter 18 at any given time. These rectangular pulses are derived from the sinusoidal voltage used in the range unit, and, therefore, their timing, or their occurrence, depends solely on the phase condition of the aforementioned sinusoidal voltage. The echo signal in Fig. 4 is illustrated at 404. When the timing of echo signal 404 and time-discriminating signals 400 and 402 is as illustrated at 4—1, the echo signal occurs simultaneously with the occurrence of the discriminating signals, and, therefore, it is medially disposed with respect to them so that equal portions of the echo signal coincide with the signals 400 and 402.

The automatic ranger comprises two parallel amplifier channels, one channel being controlled by signal 400 and echo signal 404, and the other channel being controlled by signal 402 and echo signal 404. This is illustrated at 4—2 where at 4—2A are shown the signals controlling one channel and at 4—2B the signals controlling the other channel. Only that part of the echo signal which is superimposed over the rectangular pulse 400 or 402 gets through the amplifiers. Accordingly, with the conditions indicated at 4—2A and 4—2B, the conductivities of the two parallel channels in the automatic ranger are equal, as indicated at 4—3A and 4—3B where two signals 404—A and 404—B are two equal parts of the echo signal which appear in the output circuits of the two parallel chanels. These parallel channels terminate in a comparison circuit, the output of which is proportional to the difference in magnitude of the signals illustrated at 4—3A and 4—3B. At the instant indicated at 4—3A and 4—3B, no driving torque is produced by motor equipment connected to the comparison circuit.

When the object and, therefore, the echo signal, begins to approach the radio locator, and the range unit does retain its prior setting, the time relationship between the signals will be as illustrated at 4—4A and 4—4B (assume there is an echo shift as illustrated), since the echo signal has moved to the left (i. e. nearer to the transmitted signal on the oscilloscope screen), while the time-discriminating signals 400 and 402 remain stationary because the setting of the phase shifter has not been changed. At this instant, there is no part of the echo signal superimposed over the time-discriminating signal 402 at 4—4B with the result that the output of channel B will be equal to zero, as illustrated at 4—5B, while the conductivity of channel A will be as illustrated at 4—5A, which is the same as the conductivity that existed at 4—3A. When the object producing the echo signal 404 begins to recede from the radio locator to the extent indicated at 4—6A and 4—6B, and the setting of the phase shifter again remains unaltered, the conductivity of channel A will be reduced to 4—7A while the conductivity of channel B will be increased to that illustrated at 4—7B (maximum possible conductivity). Examination of signals 2 to 7 shows that if the occurrence of the time-discriminating signals 400 and 402 remains fixed and the echo signal begins to drift either to the right or to the left with respect to these signals, it immediately increases the conductivity of one channel (see 4—7B), and decreases the conductivity of the other (see 4—7A). This change in conductivity may be used for adjusting the timing of the time-discriminating pulses 400 and 402 so that they constantly follow the echo signal and endeavor to restore the time relationship between the echo signal and the time-discriminating signals to that illustrated at 4—1 and 4—2. Since the time of occurrence of the time-discriminating pulses 400 and 402 is solely under control of phase shifter 18, it is only necessary to so adjust the setting of phase shifter 18 that the time-discriminating signals follow the echo signal as it moves either to the right or to the left in Fig. 4. This results in the automatic range determination, because it is the setting of the phase shifter that determines the range in the radio locators under consideration.

Figure 3:
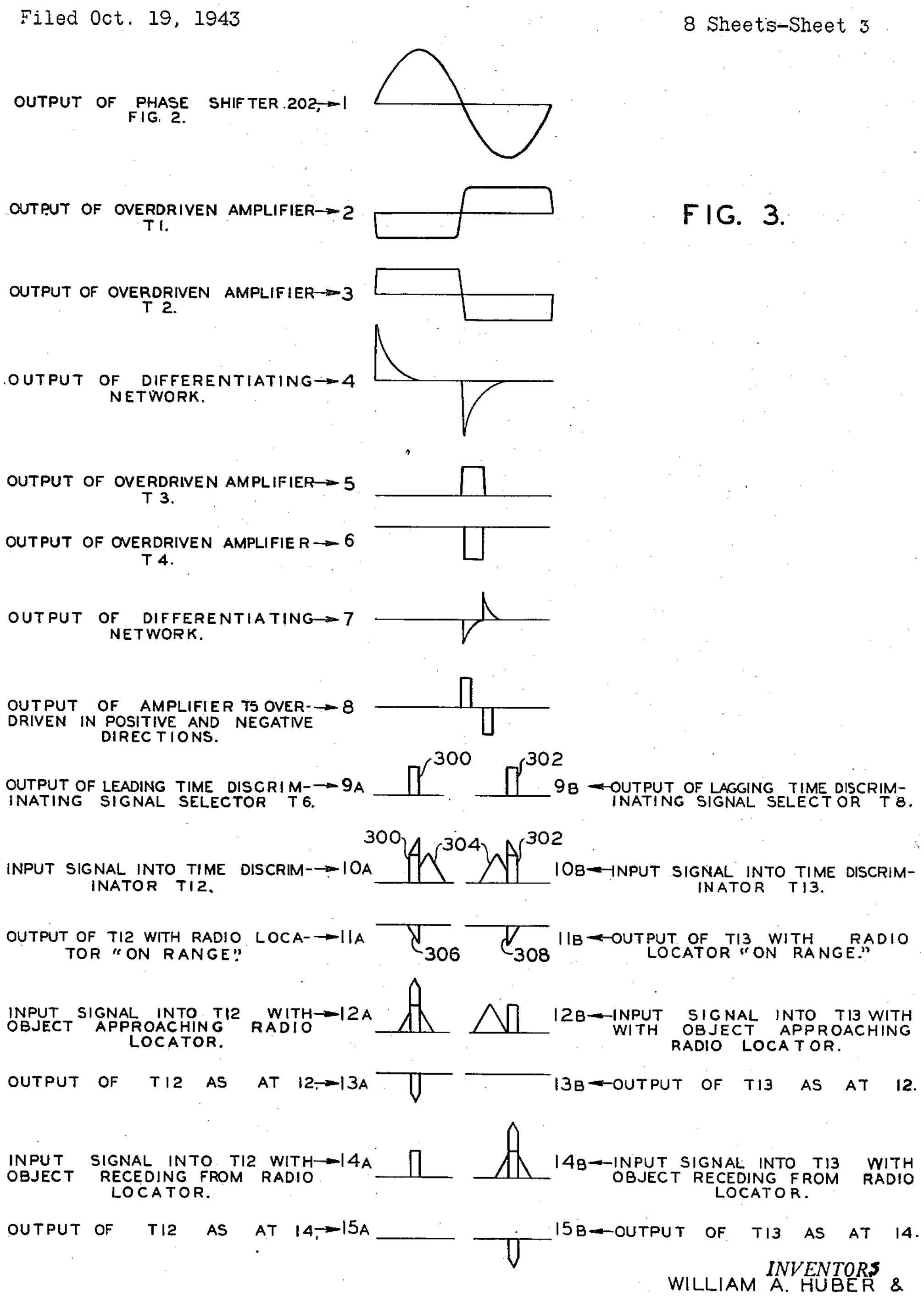

In order to accomplish the result illustrated in Fig. 4, the output of the range unit is connected over a conductor 26, Fig. 1, to a phase shifter and pulse shaper 28. The phase shifter is used for the initial cophasing of automatic ranger 21 and elevation receiver 16, while the pulse shaper reshapes the sinusoidal wave into the time-discriminating pulses 400 and 402, Fig. 4. Since these pulses represent a modified sinusoidal voltage appearing in the output of the range unit, the time-discriminating pulses 400 and 402 will always follow the phase condition of the above mentioned sinusoidal wave. The steps for reshaping the sinusoidal wave are fully illustrated in Fig. 3 where the sinusoidal voltage wave appearing in the output of phase shifter 18 is illustrated at 1. This voltage is impressed on overdriven amplifiers, the outputs of which are illustrated at 2 and 3, the latter wave being impressed on a condenser-resistance differentiating network which generates a series of positive and negative pulses 4. These are impressed on a normally, fully conductive amplifier which responds only to the negative pulses and cuts off the positive pulses, the resulting voltage wave being illustrated at 5. Wave 5 is transformed into a rectangular wave 6, which is impressed on the second resistance-condenser differentiating network, the output of which is illustrated at 7. The resulting wave 7 is impressed on an over-driven amplifier which responds to the positive as well as the negative pulses, transforming the signals illustrated at 7 into signals illustrated at 8. These are impressed on two parallel amplifiers, and the positive half of the signal is selected by one amplifier while the negative half of the signal is selected by the other amplifier. The outputs of these amplifiers are shown at 9—A and 9—B, and are numbered 300 and 302 respectively. They correspond to the time-discriminating pulses 400 and 402 in Fig. 4. The wave forms illustrated at 1 to 8 are obtained in phase shifter and pulse shaper 28 and a generator of time-discriminating pulses 30. Pulse selectors 32 and 34 select the rectangular pulses illustrated at 8, rectangular wave 300 appearing in the output of pulse selector 32, and rectangular wave 302 appearing in the output of pulse selector 34. In order to combine the pulses 300 and 302 with the desired echo signal the output of elevation and range receiver 16 is connected over a conductor 38 to a signal limiter 36, which consists of a diode and a twin triode, the combined effects of which is to limit the amplitude of echo signals as explained more fully later in this specification. The output of signal limiter 36 and the pulse selectors 32 and 34 are connected to time-discriminators 40 and 42, and it is in these time-discriminators that the combining of the time-discriminating signals 300 and 302 with the desired echo signal 304 takes place, as illustrated at 10—A and 10—B in Fig. 3. The width of the time-discriminating signals 300, 302 as illustrated is narrower than the width of the echo signal 304, but it is controllable, and may be varied to meet any particular operating requirements. The time-discriminators 40 and 42 operate so that the transmitted pulse as well as all echo signals (not shown in Fig. 3), except the echo signal 304 which partially coincides in time with the time-discriminating pulses 300 and 302, are suppressed, and have no effect on the conductivities of the time-discriminator channels. The time-discriminating signals 300 and 302 are used to so change the transconductance of the thermionic elements used in the time-discriminators that when the time-discriminating pulse occurs simultaneously with the appearance of echo signal 304 on one of the control grids of the discriminators, the portion of the echo signal coinciding with pulses 300 and 302 is amplified, and appears in the output circuit of the discriminators as signals 306 and 308 illustrated at 11—A and 11—B. From this it follows that when the time relationship between the echo signal and the time-discriminating signals is as illustrated at 10—A and 10—B, signals of equal intensity (306—308) appear in the outputs of the discriminators. These subsequently balance each other in a differential amplifier 47, the latter being connected to the time-discriminators 40 and 42 through two parallel channels of rectifying and integrating circuits 44 and a D. C. amplifier 46. The remaining signals illustrated in Fig. 3 are self-explanatory especially in view of the previously described Fig. 4. They illustrate the conditions which take place when the object either approaches or recedes the radio locator. The former condition is illustrated at 12 and 13, and the latter at 14 and 15.

To summarize the functioning of the time-discriminators 40 and 42, it may be stated that they control the conductivities of the two parallel channels in the automatic ranger; this conductivity depends upon the time relationship between the desired echo signal and the time-discriminating pulses. Moreover, they suppress all other signals which normally appear in the output circuit of the elevation receiver, and thus select only that echo signal for the parallel channels of the automatic ranger which has been selected by the range operator on the screen of the range oscilloscope. Accordingly, it is only the selected echo signal that is capable of controlling the conductivities of the parallel channels in the automatic ranger.

As mentioned previously, the outputs of the time-discriminators are connected to the two parallel rectifying and integrating circuits 44, which amplify signals 306 and 308, and impress them on the integrating resistance-condenser combinations; the latter are connected to two direct current amplifiers 46, the conductivities of which are controlled by the respective voltages appearing across the integrating condensers. The direct current amplifiers have a common push-pull resistance coupled output circuits, the voltage across the plate terminals of which varies in accordance with their conductivities. It is equal to zero when the amplifiers are equally conductive. A differential amplifier 47 is connected directly across these plate terminals, and its conductivity is controlled by the potential existing across them. This tube is connected to a secondary of a transformer, the primary winding of which is connected to an A. C. source. This transformer is used for controlling the speed of an A. C. variable speed motor 48, connected to a differential gear unit 50 the other side of which is connected to a constant speed motor 52. When the speeds of the motors 48 and 52 are equal, a shaft 54 of differential gear 50 connected to the phase shifter in range unit 18 remains stationary. If the conductivities of differential amplifier 47 and the direct current amplifiers 46 change, the speed of the variable speed motor will follow this change, causing a corresponding rotation of the phase shifter in the range unit resulting in the automatic ranging of the echo producing object. Manual control motor switches 49 are provided which enable the operator to have manual control over the variable and constant speed motors 48 and 52 for "Manual Automatic" ranging which will be described more fully later in this specification.

In order to have an indication on the screen of the range oscilloscope 20, which of the echo signals is being automatically ranged, an echo pedestal amplifier 53 is provided. It consists of two stages of amplification between generator of time-discriminating pulses 30 and the vertical plates of range oscilloscope 20. A rectangular pedestal either lifts or lowers the automatically ranged echo signal above or below the base line which provides a visual check for the range operator on satisfactory automatic ranging of the desired echo signal.

Figure 2:
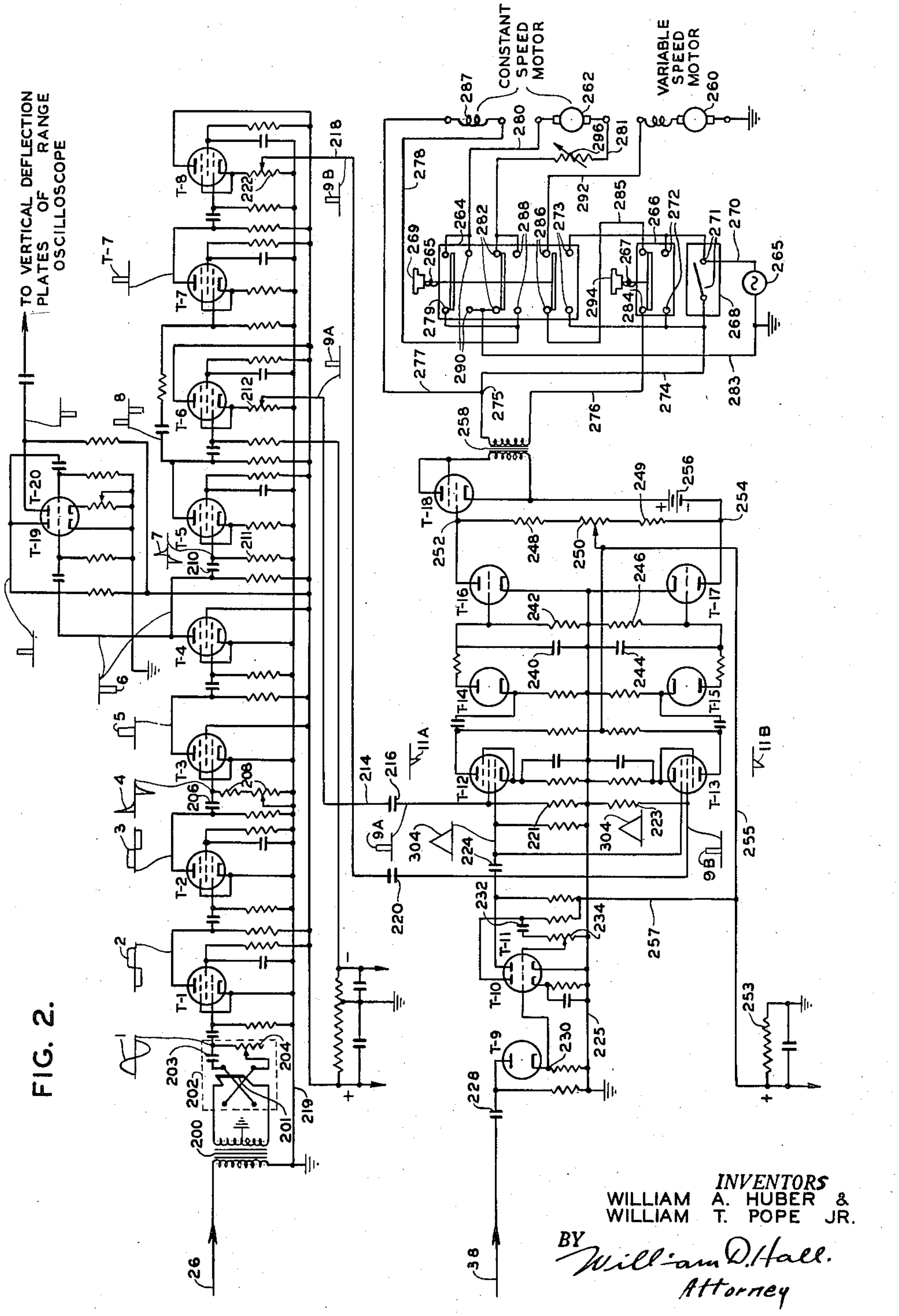
Figure 2 is a schematic circuit diagram of the automatic ranger illustrated in Fig. 1.

Referring to Fig. 2, which is the schematic diagram of the automatic ranger 21, phase shifter and pulse shaper 28, Fig. 1 corresponds to a phase shifter 202 and pulse shaping amplifier tubes T—1, T—2, T—3 and T—4; generator of time-discriminating pulses 30 corresponds to tube T—5; pulse selector 32 corresponds to tube T—6; pulse selector 34 corresponds to tubes T—7 and T—8; signal limiter 36 corresponds to tubes T—9, T—10 and T—11, time-discriminators 40 and 42 correspond to tube T—12 and T—13 respectively; amplifier and integrating circuits 44 correspond to rectifiers T—14, T—15 and condenser-resistance combinations 240, 242, 244 and 246; direct current amplifiers 46 correspond to tubes T—16 and T—17; and tube T—18 corresponds to differential amplifier 47. Variable and constant speed motors 48 and 52 correspond to motors 260 and 262 respectively, and manual control switches 49 correspond to switches 264, 266 and 268. The schematic diagram does not illustrate the differential gear 50 and its shaft 54.

Referring to the upper left portion of the schematic diagram, the sinusoidal wave appearing in the output circuit of phase shifter 18 is impressed over conductor 26 on the primary winding of a transformer 200, the center-tapped secondary winding of which is connected to a double pole, double throw switch 201 connecting the secondary of this transformer across a variable resistance-condenser combination 203, 204 comprising phase shifter unit 202 which is used for the initial cophasing of the automatic ranger with the elevation receiver channel. By varying the setting of potentiometer 204 and position of switch 201, a phase shift of approximately 270° may be obtained which is sufficient for proper cophasing of the receiver and automatic ranger. The output of phase shifter 202 is impressed on the control grid of a pentode tube T—1 which functions as an over-driven amplifier, the plate voltage output of which varies as illustrated by an oscillogram 2 appearing directly above the plate conductor of tube T—1. It should be stated here parenthetically that all voltage oscillograms appearing in Fig. 2 correspond to the same oscillograms of Fig. 3, the same numerals designating the same oscillograms. The output of this amplifier is impressed on the second overdriven amplifier T—2 which imparts to the signal impressed upon it a more rectangular form, as illustrated by an oscillogram 3. Its output is impressed on a condenser-resistance differentiating network 206, 208, the time constant of which is made adjustable by including a potentiometer in resistor 208. The voltage oscillogram of the differentiating network 206—208 is illustrated at 4. This voltage is impressed on the control grid of a normally fully conductive pentode amplifier T—3 which eliminates the positive portion of the signal illustrated at 4 altogether and amplifies only a portion of the negative pulse, the negative signal overdriving pentode T—3 so that in its output it appears as a substantially rectangular pulse illustrated by an oscillogram 5. This is impressed on the control grid of a pentode T—4 which also operates as an overdriven amplifier, transforming voltage signal 5 to a negative pulse 6 which approaches ideal rectangular form more than signal 5. This signal is impressed on the control grids of a triode T—19 and a pentode T—5, the latter being connected to pentode T—4 through a resistance-condenser differentiating network 210, 211 which differentiates the rectangular voltage wave 6 and transforms it into negative and positive signals illustrated by an oscillogram 7. Pentode T—5 operates as a positively and negatively overdriven amplifier so that the signals appearing in its plate output represent a series of positive and negative substantially rectangular voltage waves illustrated by an oscillogram 8. These are impressed in parallel on the grids of two pentodes T—6 and T—7 which correspond, as it may be recalled, to pulse selectors 32 and 34 respectively in Fig. 1. Pentode T—6 operates as a negatively biased clipping and shaping amplifier, and thus resembles in its operating characteristic class C amplifier. It selects only the positive voltage signal illustrated at 8 and suppresses the negative signal altogether. These signals appear as a series of positive rectangular voltage pulses 9A at a cathode potentiometer 212, and it is this positive rectangular voltage wave that is impressed on the screen grid of a pentode T—12 which acts as a time-discriminator 40, Fig. 1. The connection between potentiometer 212 and the screen grid of pentode T—212 is over a conductor 214 and a condenser 216. Pentode T—7, as mentioned before, corresponds to pulse selector 34, Fig. 1. It is normally fully conductive because of high screen voltage impressed on its screen grid, and it acts as an inverter as well as a clipping and selecting tube by suppressing the positive rectangular pulses impressed on its control grid, and by amplifying and squaring the negative pulses which then appear as a series of positive voltage pulses in its plate circuit illustrated by an oscillogram T—7. This signal is impressed on a pentode T—8 which acts as a shaping amplifier, the operation of which resembles class C operation. The output of pentode T—8 is impressed on the screen grid of a pentode T—13 over a conductor 218 and a condenser 220 which are connected to a cathode follower potentiometer 222. The positive rectangular voltage wave impressed on the screen grid of pentode T—13 is illustrated by an oscillogram 9B. The circuits of the screen grids of the pentodes T—12 and T—13 may be traced from a grounded bus 219, resistors 212, 222, conductors 214, 218, condensers 216, 220, screen grid resistors 221, 223 and a grounded bus 225.

The control grids of the pentodes T—12 and T—13 are connected in parallel to a coupling condenser 224 which couples the control grids to the output circuit of a triode T—11. A rectifier T—9 and triodes T—10 and T—11 comprise signal limiter 36, Fig. 1. Rectifier T—9 is connected over conductor 38 and a coupling condenser 228 to the output of elevation and range receiver 16. This rectifier is used so that no signal impressed on rectifier T—9 can swing the cathode of the rectifier and point 230, which is connected directly to the cathode of the rectifier, below ground potential but may swing it only above the ground potential; it therefore, acts as a D. C. restorer which impresses a series of positive voltage signals on the control grid of triode T—10. Triode T—10 may operate as either class A or B amplifier; it transforms the positive voltage signals impressed upon its grid into the negative voltage signals in its output circuit, and these are impressed over a condenser 232 and a grid potentiometer 234 on the control grid of the limiting stage T—11 which is fully conductive. The degree of the limiting action of triode T—11 may be controlled in several ways but it is illustrated as being controlled by grid potentiometer 234. When all echo signals have approximately the same intensity, which ordinarily is not the case, no limiting or amplitude equalizing action is necessary, and the grid resistor 234 may be set to give maximum degree of amplification that may be obtained from triode T—11 without its saturation. When the intensities of the echo signals differ widely and it is desirable to make the automatic system equally responsive to any echo signal which may be impressed upon it by the receiver, then the grid leak resistor 234 may be adjusted so that the high amplitude echo signals are somewhat limited resulting in a comparable response in the automatic ranger with the response obtained with the weak echo signals. In the systems of this type ordinarily large amounts of interference signals are always present, and it is to be kept in mind that the limiting action must never reach that point when the echo signal amplitudes are reduced to the level of the interference signals or noise level since it is obvious that if the limiting action is carried that far, the automatic ranger may become completely paralized. Accordingly, when the echo signals have very low amplitude, the limiting action of triode T—11 may be used only with a high degree of caution.

The output of the signal limiter T—11, as mentioned before, is impressed in parallel on the control grids of the pentodes T—12 and T—13 over condenser 224 as a series of positive voltage signals. An oscillogram of one echo signal is illustrated at 304 in Fig. 2. As explained in connection with the Figures 3 and 4, and especially part 10a and 10b in Fig. 3 where input signals into the time discriminators T—12 and T—13 are illustrated in proper time relationship with respect to each other when the automatic ranger is on target, only a portion of the desired echo signal 304, Fig. 3 coincides with the rectangular pulses 300 and 302 which are the signals impressed on the screen grids of the pentodes T—12 and T—13. Since the parameters of the pentodes T—12 and T—13 are so adjusted that the transconductance of the pentodes T—12 and T—13 is equal to zero with no positive voltage impressed on their screen grids, only that portion of the echo signal which coincides with the rectangular pedestals 300 and 302 is capable of rendering these pentodes conductive, the entire remaining field of signals impressed upon these pentodes by the elevation receiver 16, Fig. 1 being completely suppressed. Accordingly, the oscillograms of the signals appearing in the output circuits of the pentodes T—12 and T—13 appear as small triangles 11—A and 11—B, which correspond to the signals 306 and 308 illustrated in Fig. 3. These signals are impressed on two diode rectifiers T—14 and T—15 respectively, the plate circuits of which are connected to integrating resistance-condenser combinations 240, 242, 244 and 246. The time constants of these resistance-condenser combinations are so adjusted that smooth operation of the automatic ranger is obtained. The time constant of the resistance-condenser combinations depends to a considerable extent on the mechanical elements of the system such as inertia and power of the variable and constant speed motor 260 and 262, inertia and gear ratios of differential gear 50, and the load imposed on the driving equipment by the range unit phase shifter 18. From the point of view of sensitivity of the system, it is desirable to have the time constants of the integrating circuits as low as possible so that the automatic ranger could follow without any delay any rapid changes in the position of the target. However, when the time constants of the integrating circuits are made very small and only very limited degree of integration is provided, hunting and chattering of the driving equipment may be encountered, and, in order to avoid this, the time constant must be increased. The optimum time constant, therefore, should be equal to the value which gives smooth operation of the driving equipment without any undue sacrifice of the sensitivity of the automatic ranger. As an example of satisfactory values which were used for the integrating circuits in connection with one system, the optimum values for the condensers 240 and 244 were found to be equal to one microfarad, and for the resistances 242 and 246 equal to 250,000 ohms respectively, thus making the time constant equal to .25 second. The experimental results, however, showed that this value is not very critical, that it may be increased to one second before appreciable loss in sensitivity follows.

The potentials appearing across the integrating resistance-condenser combinations are used for controlling the conductivities of two direct current amplifier tubes T—16 and T—17 which normally operate on the straight portion of their transconductance curves. The plate circuits of the direct current amplifiers T—16 and T—17 are connected to resistances 248 and 249 respectively, and to a common potentiometer type resistance 250. The latter is used for balancing the outputs of the amplifiers T—16 and T—17 so that with the equal grid signals, the potentials between points 252 and 254 and ground are equal. A positive source of potential illustrated as a bleeder resistor 253 is connected to potentiometer 250 and the plate circuit of T—10, T—11, T—12, T—13, T—16 and T—17 over conductors 255 and 257.

A direct current amplifier tube T—18, which normally operates as a class A amplifier, is connected directly across the points 252 and 254, the control grid of T—18 being connected to point 252, and the cathode of the same tube being connected to point 254 through a biasing battery 256. When the conductivities of the direct current amplifier tubes T—16 and T—17 are equal, the potentials of points 252 and 254 are equal, and, therefore, the conductivity of the direct current amplifier T—18 depends upon the adjustment of potential of biasing battery 256, and the position of manual control motor switches 264, 266 and 268 which connect and disconnect a source of A. C. potential 265 to and from the primary of a transformer 258. The plate potential impressed on tube T—18 is an alternating current potential induced in the secondary of transformer 258 which is connected to the cathode of tetrode T—18 on one side, and to the screen grid and the plate on the other side.

Without tracing the switching circuits, which will be done later in this specification, it may be stated that the current to variable alternating current motor 260 passes through the primary of transformer 258. Since tube T—18 is connected in series with the secondary of this transformer, any variation in the conductivity of this tube will be reflected in the primary of transformer 258 as a variable load impedance, thereby controlling the current flowing through the variable speed motor 260 in proportion to the conductivity of tetrode T—18. The action of transformer 258 may be compared, therefore, with the action of magnetic amplifiers where relatively weak incoming signals, which in this case is the output of tube T—18, controls larger power supplied from the local source 265. It is to be noted that the plate voltage for tube T—18 is derived from the A. C. circuit which it is controlling. The automatic ranger is provided, as previously mentioned, with the manual control motor switches 264, 266 and 268. Switches 264 and 266 comprise two push-button switches which are normally held in the upper position indicated on the schematic diagram by means of springs 265 and 267. Switch 268 may be an ordinary knife or toggle switch which retains either a closed or open position.

Before proceeding with a detailed tracing of the circuit of these switches, it may be stated briefly what they accomplish. The operating conditions may be such that the use of the automatic ranger may not be desirable, and switch 268 is provided for disconnecting the automatic system entirely. With the automatic ranger thus disconnected, it may be still desirable to use the motor for adjusting the setting of phase shifter 18, and the switches 264, 267 and 268 are so connected that with the switch 268 open, which disconnects the variable speed motor 260, the constant speed motor 262 may be rotated in either direction by depressing either of the manual ranging buttons 269 or 270. Accordingly, "Manual-Automatic" operation of phase shifter 18 is made possible.

The second possible position of the switches is that with the push button switches 264 and 266 in their upper position indicated in the schematic diagram, and switch 268 in the closed position. With these connections, completely automatic ranging is obtained with the constant speed motor 262 running at constant speed and the speed of the variable speed motor 260 controlled by the automatic ranger.

The last alternative position of the switches is that when switch 268 is closed and either push button 264 or 266 is depressed. By pressing either of the manual ranging buttons 269 or 270, phase shifter 18 becomes immediately disconnected from the automatic ranger and "Manual-Automatic" ranging is obtained in any desired direction. The last type of operation is particularly desirable when one is ranging a poor echo signal or an echo signal that passes through other echo signals in the same range. The automatic system may have a tendency to follow the undesired echo signal, especially when the amplitude of the latter is higher than the amplitude of the selected echo, and it then becomes necessary to reset the automatic ranger on the desired signal. This is accomplished by operating one of the push buttons which would immediately reset the automatic ranger again on the desired echo signal. When the target has thus been reset on the pedestal which appears on the screen of the range oscilloscope, the operated push button may be released, thus transferring control once more to the automatic ranger.

Proceeding now with the tracing of the specific circuits, it has been stated before that when switch 268 is open and switches 264 and 266 are in their normal upper position, both motors 260 and 262 are disconnected, the open circuit is as follows: alternator 265, conductor 270 and open terminals 271, 282 and 273. To obtain the "Manual-Automatic" operation with switch 268 open, either push button 269 or 270 are depressed which immediately connects constant speed motor 262 to source of alternating current 265. To make the constant speed motor rotate in one direction, push button 269 is depressed and to make it turn in the opposite direction, push button 294 is depressed. Since the variable speed motor in this instant is at a stand still, operation of constant speed motor 262 results in the operation of differential gear 50 and turning of shaft 54, Fig. 1 either in one direction or the other, depending upon which of the buttons is depressed. It should be borne in mind that with the switch 268 open, the variable speed motor 260 is disconnected, which in turn disconnects the automatic ranger. Therefore, when the push buttons 269 and 270 are released, both motors are at a standstill and releasing of the push buttons 269 and 270 does not transfer control over the range unit to the automatic ranger since for the latter type of operation, switch 268 must be in the closed position.

Proceeding now with the tracing of the circuits for this type of operation, when push button 269 is depressed, switch terminals 273 are connected to a conductor 274 which is connected to a junction point 275. At this point the circuit divides, and the constant speed motor circuit is as follows: conductor 277, stator winding 287, conductor 278, closed switch terminals 288, conductor 281, constant speed rotor 262, conductor 280, closed terminals 290, and conductor 283 which closes the circuit of the constant speed motor at alternator 265.

The circuit of the variable speed motor 260, which is now open, begins at the junction point 275; it is as follows: the primary of transformer 258, conductor 276, closed switch terminals 284, conductor 285 and open switch terminal 286. Therefore, the variable speed motor is at a standstill whereas the constant speed motor rotates in the direction of flow of current through its stator 287 and its rotor 262. Accordingly, with the switch 268 open and switch 264 in its downward position, there is a "Manual-Automatic" operation of the range unit with the constant speed motor following either the receding or approaching target, depending upon the connections of stator 287 and rotor 262. No provisions are shown for varying the speed of the constant speed motor when it is used for the "Manual-Automatic" operation since it has been found that more satisfactory results are obtained when the operator adjusts the speed of motor 262 by pressing and depressing push button 269 and thus varying the speed of the constant speed motor 266 rather than by resorting to any potentiometer arrangements. In order to reverse the rotation of the constant speed motor 262, it is necessary to reverse the connections of either stator 287 or rotor 262. In this case the reversal is accomplished by reversing the connections of rotor 262. To accomplish this reversal, push button 269 is released and push button 294 is depressed, thus shorting the switch terminals 272. The circuit of the constant speed motor in this instance is as follows: alternator 265, conductor 270, closed switch terminals 272, conductor 274, junction point 275, conductor 277, strator 287, conductor 278, closed switch terminals 279, conductor 280, rotor 262, conductor 281, closed switch terminals and conductor 283 connected to the opposite terminal of source of alternating current 265. At this instant, the variable speed motor circuit is open at the switch terminals 284. When push button 294 is released, then both motors are disconnected since all circuits are open at the switch terminals 271, 272 and 273.

It now remains only to describe the last mode of operation which takes place when switch 268 is closed and the switches 264 and 266 are either in their normal upper position or depressed one switch at a time. As explained previously, with the switch 268 in a closed position, the automatic ranger is connected to the variable speed motor, the constant speed motor is running if there are no echo signals at exactly the same speed as the variable speed motor, and, therefore, differential gear shaft 54 remains stationary. It should be mentioned here that a variable resistance 296 is connected in series with rotor 262 for the initial adjustment of the constant speed motor to the mean speed of the variable speed motor. When the conductivity of tube T—18 changes, which happens when an echo signal displaces itself with respect to the time-discriminating signals, the impedance of transformer 258 follows the change in the conductivity of tube T—18 with the resulting increase or decrease in the current flowing through the variable speed motor and corresponding changes in its speed of rotation. The circuit of the variable speed motor is as follows: alternator 265, conductor 270, closed switch contacts 271, conductor 274, junction point 275, the primary of transformer 258, conductor 276, closed switch contacts 284, conductor 285, closed switch contacts 286, conductor 292 and grounded variable speed motor 260 which completes the circuit to the grounded conductor 283 of alternator 265. The constant speed motor circuit has been traced previously and it is not necessary to repeat it now. When either push button 279 or 270 are depressed, the variable speed motor circuit becomes open either at the switch terminals 284, when push button 294 is depressed, or at the switch terminals 286 when push button 269 is depressed. Therefore, when it becomes necessary to resort momentarily to the echo resetting procedure previously described, it is only necessary to operate either one of the two push buttons which immediately stops the rotation of the variable speed motor and allows the constant speed motor to rotate in the same direction, or in the reverse direction depending upon the operated push button. When the push button is depressed, the variable speed motor is disconnected at the switch terminals 286 and rotor 262 is connected to source 265 in the reverse direction reversing the direction of rotation of the constant speed motor. This produces the "Manual-Automatic" ranging in one direction with the automatic ranger being momentarily disconnected. When the push button 269 is released, the entire control is immediately transferred again to the automatic ranger.

When push button 270 is depressed, the variable speed motor is disconnected at the open switch terminals 284, and the constant speed motor 262 rotates in the same direction, "Manual Automatic" operation in the opposite direction results. The circuits for these conditions have been traced previously, and, therefore, need no additional repetition.

*Summary of the operation of the automatic ranger (Figs. 1 and 2)*

The operation of the automatic ranger has been described already in detail in connection with the decription of its block and schematic diagrams. Therefore, only a brief summary of its operation will be given here.

The range is determined by measuring the interval of time which exists between the transmitted pulse and an echo signal by means of a phase shifter, the degree of phase shift being used for direct determination of range by calibrating the dial of the phase shifter in linear units. All channels, i. e. the transmitting, receiving and automatic tracking and ranging channels are synchronized by means of the sinusoidal wave generated by the synchronizing oscillator. By varying the setting of the phase shifter it is possible to maintain a fixed relationship between the desired echo signal and a reference point on the screens of all oscilloscopes. For automatic range determination, it is, therefore, necessary to follow any change in range of a moving object with corresponding automatic change in the setting of the phase shifter. The disclosed automatic ranger accomplishes this result by modifying the sinusoidal wave into two time-discriminating pulses which are used for electrically indicating the setting of the phase shifter in the automatic ranger, and by continuously electrically observing the time relationship between the time-discriminating signals and the desired echo signal. Two normally balanced channels are controlled by their respective time-discriminating signal and the selected echo, and any change in the time relationship between the echo and the time-discriminating signals is used for decreasing a conductivity of one channel and increasing the conductivity of the other. After proper amplification and integration, the outputs of the two channels are compared in a differential amplifier which is used for controlling the speed of a variable speed motor through a variable load impedance connected in series with a source of alternating current and the variable speed motor. A differential gear is connected to the variable speed motor on one side, to a constant speed motor on the other side, and to the phase shifter with its driving shaft. When the system is "on range" the driving shaft remains stationary. Manual control motor switches are provided which may be used for the initial selection of the desired echo signal by means of a motor drive which upon the selection may be operated so as to transfer the control over the phase shifter to the automatic ranger which will automatically follow from then on any changes in range by varying the setting of the phase shifter.

A visual marker is provided to constantly indicate on the screen of the range oscilloscope whether the automatic ranger follows the desired echo signal. If, because of interference of other echoes or some other cause, the automatic ranger loses the selected echo, the manual control motor switches, together with the visual marker generated by the automatic ranger, may be used for immediate resetting of the automatic ranger on the desired echo signal. The sensitivity and the precision of the automatic ranger may be controlled by varying the parameters of the vacuum tube circuits which control the width of the time-discriminating signals and the amplitude of the selected echo signal. By making the time-discriminating signals narrower, the precision of the automatic ranger may be increased; if this is carried too far, loss of stability and decrease in output may result. Since there is no reason why the automatic ranger should follow more faithfully a stronger echo signal than a weaker echo signal, a signal limiter is provided between the receiver and the automatic ranger which may be adjusted so as to limit the amplitude of the strong echo signals, and thus equalize the response of the automatic ranger to the echo signals which have different amplitudes.

In our patent application, Serial No. 478,862, we described the equipment and the operation of the automatic trackers which may be used for automatic pointing of the azimuth and elevation arrays directly at the echo producing object. As fully disclosed in the above application, after proper orientation of the antenna arrays, the control over the antenna mounts may be transferred to the automatic trackers which will from then on follow the moving object with the antenna arrays. By providing the automatic ranger in addition to the automatic trackers completely automatic following of the moving object is made possible. As pointed out in the beginning of this specification, completely automatic following of the moving object may enable one to realize the ultimate possible accuracy of the radio locators and to avoid the errors which are ordinarily committed by the operators when manual following of the moving object is used. The disclosed automatic ranger thus increases the accuracy of the obtained results by eliminating the errors which are inherently present when manual ranging is the only mode of ranging at one's disposal.

The additional advantage of the automatic target following resides in the fact that it becomes possible to obtain a uniform and smooth flow of range data. This is the case with the automatic systems because of the integrating circuits used in the outputs of the rectifiers, and slight degree of the fly-wheel effect or inertia offered by the motor and the mechanical transmission system. Since the degree of lag of the automatic ranger is fairly constant, it is possible to introduce a fixed amount of corrective compensation into the range unit, or a gun director, if such is used. While such compensation is possible in this case because of the known and controllable performance characteristics of the automatic systems, no such corrective compensation is possible in connection with the manually operated system because of the unpredictable nature of the manual errors.

*Self-synchronous radio locator*

Figure 9 is a block diagram of the self-synchronous radio object-locating system which obtains synchronization of the receiving channels with the transmitting channel from the same voltage pulse which is used to key the transmitter. This pulse is generated by means of a line pulse modulator, or alternately called spark gap modulator, which may have different degrees of stability depending upon the type of spark gap used. The main advantages of the spark gap modulator as compared to the modulation obtained from a master oscillator reside in the fact that the spark gap modulators represent a much lighter equipment, it is possible to radiate pulses of extremely short duration and greater power by means of a spark gap keyed transmitter, and the rate of keying of the transmitter may be very readily changed which results in change of range of the radio locator. In the spark gap modulated systems, the interval between successive pulses is usually fairly long as compared to the duration of the pulses, and both the repetition rate and pulse duration vary considerably from one application to another.

In the radio object locators the pulse duration is usually in the order of one to two microseconds and the repetition rate varies from 400 to 2,500 pulses per second. In principle, the spark gap modulation method consists in switching on and off the high tension supply to the oscillator so that the valve is on for the duration of the pulses and off in the interval between the pulses. On account of the short duration of the pulse, the relatively high repetition rate, and the high peak power in the pulses, special switching and timing methods are used. These methods ordinarily consist of a rotary spark gap which consists of two spark gap electrodes moving relative to each other so that they only approach sufficiently close for a spark to strike at regular intervals. This is the so-called rotary spark gap arrangement. The spark gaps of this type are not electrically stable, and, in order to increase their stability, they are sometimes provided with the auxiliary electrodes which are used for initiating the breakdown of the gap by means of pulses of higher potential but of lower power than the main pulses. These triggering pulses impressed over the triggering spark gap, on account of their lower power, can be produced at regular intervals by a valve circuit which results in the regularity of the repetition rate not only of the triggering spark gap but of the main gap as well. This regularity may be such that it approaches the regularity of the synchronous systems using master oscillators. The arrangement of this type is disclosed in a patent application, Serial No. 492,232 by William G. Mayer, entitled "Triggering Spark Gap" and filed on June 25, 1943, now Patent Number 2,472,115.

In describing the synchronous system disclosed in Fig. 1, it may be recalled that the synchronizing oscillator represents the basic component of the entire system, and synchronous operation of the transmitting, receiving, automatic tracking and automatic ranging channels depends entirely on the sinusoidal wave generated by the master oscillator. Since there is no master oscillator in Fig. 9 and the entire system is synchronized by means of the voltage generated by the line pulse modulator, it follows that the synchronization equipment in Fig. 9 must assume a different form than the same equipment in Fig. 1. The same is true of the circuits for the oscilloscopes. In the synchronous systems, the pulse repetition rate, as a rule, is much higher, and the oscilloscope beam ordinarily remains operative during the entire duration of the operating cycle. In the self synchronous systems, because of a much lower repetition rate, the oscilloscopes remain operative only during a portion of the interval of time between the consecutive modulation pulses, and it becomes necessary to provide proper voltage for blanking the oscilloscope beams during the idle and return periods.

The changes which are necessary in the automatic tracker and the automatic ranger relate to those channels of the automatic equipment which modify the sinusoidal wave from the synchronizing oscillator in Fig. 1 into the echo selecting pulses in the automatic tracker and into a series of rectangular time-discriminating pulses in the automatic ranger. The missing link previously furnished by the master oscillator is now provided by special circuits which take its place.

Referring to Fig. 9 which is a block diagram of the self-synchronous radio object-locating system with the azimuth, elevation, and range channels, and automatic trackers and ranger, the general disposition of elements in the figure is as follows: the azimuth receiver is illustrated at 901 in the upper left corner of the diagram and the elevation receiver 902 in the lower left corner. Except for the connections of the elevation and azimuth oscilloscopes 904 and 906, these receivers are identical to the elevation and azimuth receivers 10 and 16 in Fig. 1. The transmitting channel consists of a line pulse modulator 908 and a transmitter 910. The line pulse modulator 908 consists of a spark gap modulator, described previously, which furnishes high voltage potential for the oscillator of transmitter 910. The automatic tracker 912 is illustrated at the upper right corner of the diagram. It is identical to the automatic tracker fully disclosed in our application, Serial No. 478,862, except that the echo selector and pulse generator 19 illustrated in a block form in Fig. 1 is not used any longer since in the disclosed self-synchronous system there is no source of sinusoidal wave available. The automatic ranger 914, which appears in the lower right corner of the block diagram is identical to the automatic ranger illustrated in Figs. 1 and 2 with one exception: the phase shifter and pulse shaper 28, Fig. 1, is no longer used, since, as previously mentioned, no source of sinusoidal voltage is used in the disclosed system, and it becomes necessary to devise some other means for synchronizing its action with the remaining system.

Before proceeding with a more detailed description of the equipment which differentiates the self-synchronous system from the system disclosed in Fig. 1, it may be stated that since the system disclosed in Fig. 9 does not have any master oscillator and range unit phase shifter 18, it is electrically simpler in the self-synchronous system to permanently fix the lateral position or timing of the horizontal base lines of the range, azimuth and elevation oscilloscopes; therefore, in this case they cannot be imparted any lateral shifts any longer and it becomes necessary to provide some other means for identifying the desired echo signals on the screens of these oscilloscopes. As in the case of Fig. 1, the range operator selects the echo, and this echo is reproduced on the screens of the azimuth and elevation oscilloscopes. To accomplish this, the control grids of the azimuth and elevation oscilloscopes 904 and 906 are connected to a source of voltage which normally illuminates these oscilloscopes only for the desired echo signal and blanks the remaining fields. Accordingly, the signals normally appearing on the screens of the azimuth and elevation oscilloscopes are like those illustrated in Figs. 7 and 8. Controls are provided which enable one to vary the voltage impressed on the control grids of these oscilloscopes enabling the azimuth and elevation oscilloscope operators to reproduce the entire range field if such reproduction may become temporarily desirable. When this is the case, then the echo selected by the range operator appears more brightly illuminated than the remaining field.

Figure 10:
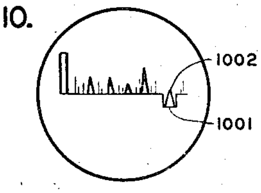

Since timing of the horizontal base line of the range oscilloscope 916 is now also permanently fixed with respect to the modulation pulse, the range oscilloscope is now provided with a rectangular notch or a marker which may be laterally displaced with respect to the visual field thus enabling the range operator to use this marker for measuring the range of the echo signal selected by him. This is accomplished by varying the setting of a potentiometer in a range index generator 918, the function of which will be described more fully later in this specification. Suffice it to say at this instant that when the potentiometer setting in range index generator 918 is changed, the lateral position of the marker on the screen of the range oscilloscope follows this change. The range oscilloscope screen with the signals and the marker are illustrated in Fig. 10 where the marker appears as a rectangular notch 1001 with an echo signal 1002 centrally positioned in the notch. This is the case when the potentiometer reading of the range index generator 918 is set so as to measure the proper range distance to the object producing the echo signal 1002.

As mentioned previously, the system is so arranged that when the range operator adjusts the lateral position of notch 1001, he automatically selects the same echo signal on the screens of the azimuth and elevation oscilloscopes as illustrated in Figs. 7 and 8. Accordingly, the range distance is measured by placing the desired echo signal in the notch 1001, Fig. 10, and noting the potentiometer setting of range index generator, while the azimuth and elevation angles are measured in the same manner as in connection with the synchronous system disclosed in Figs. 1 and 2, which is accomplished, as it may be recalled, by pointing the mean lobe axis of the antenna arrays directly at the object. This results in the reception of equal intensity echo signals on the two antenna lobes as illustrated in Fig. 8.

Figure 11:
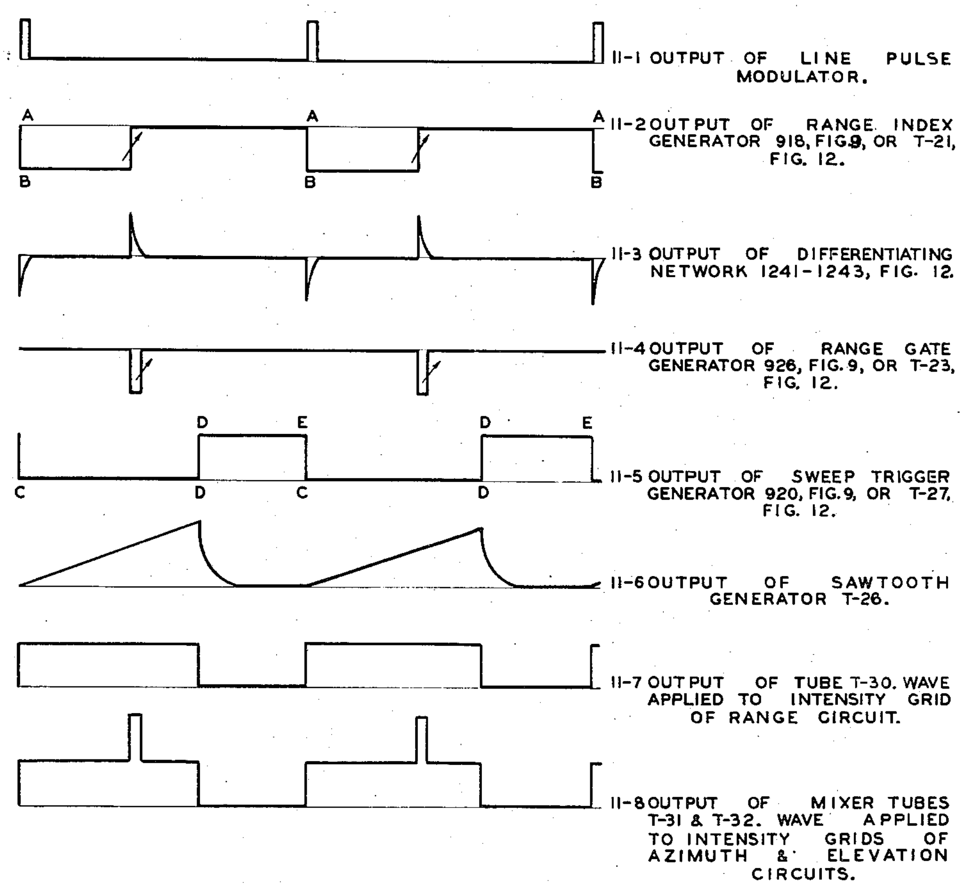

To accomplish these results, the voltage generated by line pulse modulator 908 is impressed on a sweep generator 920 consisting of a delayed multivibrator which generates a series of rectangular waves illustrated at 11—5 in Fig. 11. These rectangular waves are impressed on a sweep generator 922 which generates a sawtooth wave illustrated at 11—6 in Fig. 11. The latter is impressed on the horizontal plates of the azimuth, range and elevation oscilloscopes over conductor 924 so that the horizontal base lines of all three oscilloscopes function in unison. The periodicity and timing of this saw-tooth wave is determined by the periodicity of rectangular wave 11—5, which in turn is controlled by a pulse 11—1 produced by line pulse modulator 908. Therefore, the periodicity of the waves 11—5 and 11—6 remains fixed.

The output of the line pulse modulator 908, which is pulse 11—1 in Fig. 11, is also impressed on a range index generator 918, consisting of a precision delayed multivibrator circuit. This multivibrator has a potentiometer connected to the control grid of the first tube and it is this potentiometer that is used for range determinations. The output of this delayed multivibrator is illustrated at 11—2 in Fig. 11; it consists of a rectangular wave the duration of which may be varied by varying the setting of the potentiometer. This is illustrated in Fig. 11 by the arrows on one side of the rectangular wave which indicate that the occurrence of this step is controllable while the occurrence of step *a*—*b* is fixed and is under control of pulse 11—1. The output of range index generator 918 is impressed on a differentiating network in the input circuit of a range gate generator 926 where it is transformed into a series of positive and negative pulses 11—3, Fig. 11. These are impressed on a delayed multivibrator circuit in range gate generator 926 which eliminates the negative pulses and transforms the positive pulses into a series of rectangular pulses 11—4. The time constants of the differentiating networks as well as the parameters of the multivibrator are adjustable so that the width of the negative rectangular pulses 11—4 may be varied as indicated by the arrows. Normally, the width of this pulse is adjusted so that its duration is slightly longer or equal to the duration of an average echo pulse. The output of range gate generator 926 is impressed over conductor 928 on a generator of time-discriminating pulses 30 of the automatic ranger 914 which corresponds to the same generator 30 illustrated in Fig. 1. The function performed by the negative pulse 11—4 in generator of time-discriminating pulses 30 is the same as that performed by negative pulse 6 impressed on pentode T—5 and triode T—19 in Fig. 2. The same negative pulse 11—4 is also impressed after its inversion in an inverter 930 on an echo selector 932 which selects the same echo signal for the automatic tracker that has been selected by the range operator, as it will be described more fully in connection with Fig. 13. The negative pulse 11—4 is also impressed on an inverter 932, the output of which is connected over a conductor 934 to an echo selector in an elevation tracker 960 which is identical in all respects to azimuth tracker 912.

The output of sweep trigger generator 920 illustrated at 11—5 in Fig. 11, besides being used for the control of sweep generator 922 is also used on the control grid of the range oscilloscope tube where it illuminates the range oscilloscope for the desired periods of time. The connection is through a conductor 938 and two amplifier stages comprising a range intensity amplifier 936, the output of which is illustrated at 11—7 in Fig. 11. It may be seen from examination of Fig. 11 that the occurrence of the positive rectangular waves 11—7 coincide in time with the occurrence of the linear portions of the sawtooth waves 11—6 so that it is only during this period of time that the beam reaches the screen of the range oscilloscope.

It has been previously mentioned that a rectangular notch 1001, Fig. 10, is used on the screen of the range oscilloscope as a range index marker. To produce this notch the output of range gate generator 926 is connected over a conductor 940 to an echo pedestal amplifier 942, the latter being connected on one side to range oscilloscope 916, where it produces the above mentioned notch, and on the other side to an intensity amplifier and mixer 944 which is also connected to range intensity amplifier 936. In mixer 944 rectangular wave 11—7 is combined with marker wave 11—4 after proper inversions, and the combined wave assumes a form illustrated at 11—8 in Fig. 11. This wave is impressed on the control or intensity grids of the elevation and azimuth oscilloscopes 904 and 906 over a conductor 946 where it is used for overcoming the blocking negative potential normally impressed on the intensity grids of these oscilloscopes. The amplitude of wave 11—8 is controllable and depending upon its amplitude only the desired echo signal or the entire range field is reproduced on the screens of the elevation and azimuth oscilloscopes.

No description is necessary of the automatic ranger 914, since, with the exception of the modifications that have been already described, its block diagram is otherwise identical with its block diagram in Fig. 1. It should be mentioned, however, that a driving shaft 950 is now connected to range index generator 918 where it controls the setting of the potentiometer arm previously mentioned in this specification. Shaft 950 in Fig. 9 otherwise corresponds to shaft 54 illustrated in Fig. 1.

Referring now to Fig. 12 which is the schematic diagram of that part of the apparatus which is used for interconnecting line pulse modulator 908 with the oscilloscopes and the automatic tracker and ranger, the positive pulse generated by line pulse modulator 908 is impressed on multivibrator tubes T—21 and T—22 over a conductor 1202 and a coupling condenser 1204. This precision delayed multivibrator circuit corresponds to range index generator 918 in Fig. 9 which is used for generating, after several additional modifications of its output, rectangular notch 1001, Fig. 10.

This multivibrator comprises a twin triode T—21—T—22 biased multivibrator, the width of the output pulse of which is a linear function of the grid bias impressed on the grid of the first triode T—21. The biasing potential impressed on the grid of triode T—21 by a source of positive potential illustrated as a bleeder resistor 1206 is impressed over a conductor 1208, resistors 1210, 1212, 1214 and grounded resistors 1216 and 1218. Resistor 1216 comprises the range determining potentiometer used for controlling the biasing potential impressed on the grid of triode T—21 through a potentiometer arm 1220 and a grid leak resistor 1222. Filter condensers 1224, 1226 and 1228 are provided for stabilizing the potential normally impressed on the control grid. Variable resistors 1214 and 1218 are used for adjusting the biasing potential normally impressed on the grid of triode T—21 to the desired value, and for adjusting the circuit parameters when it becomes necessary to replace one tube with another. The common cathode of the triodes is connected to ground over a cathode resistor 1230, and the plates are connected to a positive source of potential 1206 over resistors 1232, 1234 and 1236. The grid of triode T—22 is coupled to the plate of triode T—21 over a condenser 1239, and to the positive source of potential over resistances 1240 and 1236. Resistor 1236 and condenser 1244 are used as an RC filter which counteracts the voltage variations appearing at the plates of triodes T—21 and T—22 because of their coupling through a common power supply to other parts of the circuit. This RC filter thus acts as a means for stabilizing the potentials impressed on the plates and the grid of the triodes T—21 and T—22.

The operation of this multivibrator circuit is as follows: normally the second triode T—22 is conductive since its grid is held at approximately the cathode potential by the grid current through the large grid resistance 1240. The voltage drop through the common cathode resistance 1230 is sufficient to make the cathode positive with respect to the grid of the first triode T—21 which is, therefore, nonconductive. Condenser 1239 is charged to a voltage equal to the potential difference between the plate of T—21 and the grid of T—22 because of the small grid current drawn by T—22. A positive trigger voltage 11—1, Fig. 11 is applied through a small coupling condenser 1204 to the grid of T—21. The time constant of the grid circuit is made very small (in the order of one quarter of a microsecond), so that only high frequency components of the trigger pass into the grid circuit. A diode may be used to insure that the voltage applied to the grid is positive, hence a positive trigger of about 0.2 microsecond results and T—21 hereby becomes conducting. The plate voltage of T—21 drops, and through condenser 1239 the grid of T—22 is driven below the new cathode potential. The cathode potential falls immediately after the trigger pulse to a value which is determined by the grid bias impressed on the grid of T—21 by potentiometer 1216. In this condition T—21 is conducting and T—22 is nonconducting.

As the grid of T—22 is no longer conducting, condenser 1239 discharges through the resistances 1232 and 1240. The grid potential of T—22 rises to the point at which T—22 begins to conduct. At htis point T—21 is cut off and the multivibrator returns to the quiescent condition. The change occurs very rapidly and in a regenerating fashion. With the beginning of the current in T—22 the cathode potential rises to cut off T—21 which in turn raises the grid potential of T—22 through condenser 1239 increasing the current in T—22.

The pulse width can be altered by changing the values of the resistances 1240, condenser 1239, resistance 1230, or the grid potential impressed on the grid of T—21 by potentiometer resistance 1216. The variation of the grid potential is actually the most convenient method of controlling the pulse width. Its principal effect occurs in changing the cathode potential when T—21 is conducting and thereby changing the amount condenser 1239 must discharge before T—22 begins ot conduct. It also varies the plate voltage of T—21 when it is conducting. It may be shown experimentally as well as theoretically that this, together with the curvature of the grid plate characteristics of T—21, results in a high degree of compensation of the inherently nonlinear relationship between the voltage and discharge time of condenser 1239. Because of the highly accurate linear relationship between the pulse width and the grid voltage, the multivibrator composed of the tubes T—21 and T—22 is here referred to as a precision delayed multivibrator. This highly accurate linear relationship between the pulse width and the grid voltage is utilized for obtaining the range marker, the later position of which on the screen of the range oscilloscope may be adjusted by adjusting the setting of potentiometer arm 1220 on grid potentiometer 1216.

It has been previously stated that the width of the rectangular wave 11—2, Fig. 11, may be varied by varying the potentiometer setting in range index generator 918. This potentiometer is potentiometer 1216, the setting of which determines the duration of the negative pulse illustrated at 11—2, Fig. 11. This voltage pulse appearing across resistance 1232 is impressed over a coupling condenser 1241 and a grid resistor 1243 on the control grid of the first stage of the second delayed multivibrator circuit consisting of triodes T—23 and T—24. The time constants of condenser 1241 and resistance 1243 are made very small so that they act as a differentiating network with respect to the rectangular wave 11—2. The output of this differentiating network appears at 11—3 in Fig. 11. The negative and positive pulses produced by the differentiating network 1241—1243 are impressed on the control grid of T—23 which is so biased that the negative pulses have no effect on this tube while the positive pulses render tube T—23 conductive and tube T—24 nonconductive resulting in the generation of the rectangular pulse 11—4, Fig. 11, which is eventually used as a marker or a notch on the screen of the range oscilloscope. The functioning of this multivibrator circuit is identical in all respects to the functioning of the first precision delayed multivibrator circuit T—21—T—22, but the parameters of this multivibrator are so adjusted that the width of the rectangular pulse generated in the output circuit of T—24 is either substantially equal to slightly longer than the duration of an average echo pulse. This pulse is illustrated at 11—4 in Fig. 11; its width is equal to or is somewhat wider than the width of pulse 11—1. Pulse 11—4 is impressed on a condenser 1246 and resistance 1248 which corresponds to condenser 210 and resistance 211 illustrated in Fig. 2, this condenser-resistance combination having a very small time constant so that it acts as a differentiating network in the same manner as condenser 210 and resistance 211 in Fig. 2. From then on the circuits of the automatic ranger are identical to the circuits disclosed in Figs. 1 and 2, pentode T—5 being connected to pentode T—6 etc.

The output of the delayed multivibrator T—23, T—24 is also connected over a conductor 1250 and a condenser 1252 to the control grid of a triode T—19 which corresponds to the triode T—19 illustrated in Fig. 2. It may be recalled by referring to Fig. 2 that the output of this triode is connected to triode T—20, the output of the latter being connected to the vertical deflection plates of the range oscilloscope 916, Fig. 9. The purpose of the twin triode T—19, T—20 is to amplify and reshape the signals impressed upon it into a rectangular pulse 1254 which is used for producing the rectangular notch 1001, Fig. 10, on the screen of a range oscilloscope 1278. The connection between one of the vertical plates of a range oscilloscope tube 1278 and the output of T—20 is over a condenser 1253 and a conductor 1257. The output of triode T—19 is also connected from an adjustable grid potentiometer resistance 1258 over a conductor 1256 to the control grid of a triode T—32. The purpose and functioning of this triode will be described later on in this specification.

The output of tube T—23 is also connected over the same conductor 1250 and condenser 1252 to the control grid of an inverter and isolating amplifier T—33, the output of which is connected over a condenser 1251 and a conductor 1247 to the screen grid of an echo selecting tube 1304, Fig. 13, in the automatic tracker which will be described later in the specification. Suffice it to say at this instant that the positive rectangular pulse appearing in the output of T—33 is used for selecting the desired echo signal in the automatic tracker, and, therefore, acts as a so-called "gate" pulse.

From the description of the schematic diagram given thus far, it follows that the first precision delayed multivibrator circuit T—21, T—22 is used for generating the rectangular wave 11—2, Fig. 11, the duration of which is modified in the second delayed multivibrator circuit T—23, T—24 into the notch producing voltage impressed on the vertical deflection plates of range oscilloscope 1278 where it acts as a marker indicating the setting of the grid potentiometer arm 1220. Since this potentiometer is calibrated either in yards, miles or other linear units, its setting at once determines the range of the object of that echo signal which has been placed into the notch by the operator of the range oscilloscope. The same two multivibrators are also used for controlling the generation of the two time-discriminating signals 9A and 9B, Figs. 2 and 3, which are used for selecting the desired echo signal in the parallel channels of the automatic ranger and for indicating the time relationship between the time-discriminating signals and the desired echo signal. While in connection with Figs. 1 and 2, the time-discriminating signals indicated the settng of the range unit phase shifter 18, in Fig. 12 the time-discriminating signals indicate the setting of the range measuring potentiometer 1216. Accordingly, if one is to have an automatic ranger determination in connection with Fig. 12, shaft 950, Fig. 9, of the differential gear 952, which is not illustrated in Fig. 12, must be connected to a potentiometer arm 1220. This is indicated by a dotted line 1260 in Fig. 12 which illustrates diagrammatically the mechanical connection which exists between the potentiometer arm 1220 and the differential gear 952, Fig. 9.

It now remains to describe in the schematic diagram that portion of the self-synchronous system which is used for controlling the generation of the saw-tooth waves used for horizontal sweeps of the range, azimuth and elevation oscilloscopes, and the generation of the signals impressed on the intensity grids of the range, azimuth and elevation oscilloscopes making the beams of these oscilloscopes visible only during the desired portions of their operating cycles. This circuit also begins with conductor 1202 which, as it may be recalled, is connected to the line pulse modulator 908. Accordingly, the keying pulse generated by line pulse modulator 908 is impressed over a coupling condenser 1262 on the control grid of an isolating amplifier T—25 which acts as a linear amplifier of the positive pulses impressed on its grid. Its output is impressed by means of a cathode resistor 1264 and a coupling condenser 1266 on the control grid of the third delayed multivibrator circuit consisting of triodes T—27 and T—28. The parameters of T—27 and T—28 are adjusted by means of a variable grid resistor 1268 so that the rectangular pulse 11—5, Fig. 11, generated by this multivibrator corresponds to the maximum range of the self-synchronous radio locator. The negative voltage output of this multivibrator is impressed on a saw-tooth oscillator tube T—26, condenser 1270 generating a saw-tooth wave voltage 11—6, Fig. 11. The connections between the plate of tube T—27 and the grid T—26 is through a condenser 1269 and a grid resistor 1271. When the duration of the negative rectangular pulse *c—d* is approximately twice as long as the duration of a *d—e* pulse, the latter occurring when triode T—27 is non-conductive, then the capacitive coupling between triode T—27 and saw-tooth oscillator tube T—26 may give satisfactory coupling between these two tubes. However, when the duration of the negative pulse *c—d* is increased and the duration of the non-conductive period *d—e* is decreased, the capacitive coupling between T—27 and T—26 may prove to be troublesome because condenser 1269 may accumulate such a charge which could not be discharged during the relatively short discharge period. When the non-conductive period *d—e* is relatively short as compared to the conductive period *c—d*, the capacitive coupling between T—27 and T—26 must be replaced with a direct coupling. This type of coupling is well known in the art and needs no illustration. Capacitive coupling is illustrated in Fig. 12 because of its simplicity. It is to be understood, however, that when the aforementioned necessity arises, it may be replaced with the direct coupling connections between the tubes T—27 and T—26.

The saw-tooth voltage 11—6 is impressed over a conductor 1272 on a horizontal sweep amplifier 1273 of the range, azimuth and elevation oscilloscopes 1278, 1280 and 1282, the horizontal deflection plates of which are connected to the output of amplifier 1273 over conductors 1271. The output of the third delayed multivibrator T—27, T—28 is also impressed over a conductor 1272 on the control grid of an inverter and isolating amplifier T—29, the output of which is impressed on an amplifier T—30, the cathode resistance 1274 of which is coupled over a conductor 1276 to the intensity grid of range oscilloscope tube 1278. The positive rectangular wave impressed on the intensity grid of this oscilloscope appears at 11—7 in Fig. 11. Since the duration of this wave is equal to the duration of the linear portion of the saw-tooth wave 11—6, the range oscilloscope beam is visible only during the linear portion of the saw-tooth wave, the return portion of the beam being blanked out. In order to select on the screen of the azimuth and elevation oscilloscope tubes 1280 and 1282, only the desired echo signal, the rectangular wave 11—7 is impressed on an intensity amplifier and mixer tube T—31—T—32 which has its common cathode potentiometer resistor 1284 coupled to the intensity grids of the azimuth and elevation oscilloscope tubes 1280 and 1282 over a conductor 1286 and a condenser 1288. The control grid of triode T—31 is coupled to a potentiometer 1289, while the control grid of triode T—32 is coupled to the output of T—19 over a conductor 1256 and a variable grid potentiometer resistance 1258 which is common to the grids of T—20 and T—32. It may be recalled that this connection impresses the positive notch signal on the control grid of this tube. The two rectangular waves combine in the common cathode resistor 1284 to produce a positive voltage signal 11—8, Fig. 11. By varying the settings of the potentiometers 1289, 1258 and 1284 it is possible to vary the amplitudes of the entire composite rectangular wave 11—8 or its components so that either the range field or only the desired echo signal is reproduced on the screens of the elevation and azimuth oscilloscopes, the potentiometers 1258 and 1289 varying the amplitudes of the rectangular waves impressed on the grids of the mixer while potentiometer 1284 varies the amplitude of the composite wave appearing in the output of mixer T—32. The connections of the elevation, range, and azimuth oscilloscopes are otherwise of well known conventional type and need no detailed description. The vertical plates of the range and elevation oscilloscopes are connected through a video amplifier 1290 to elevation receiver 902, Fig. 9, and the plates of the range oscilloscope are isolated from the elevation oscilloscope by means of an isolating amplifier 1291. The isolating amplifier is used for preventing the notch signal which is also impressed on the vertical plates of the range oscilloscope over conductor 1257 from appearing on the screen of the elevation oscilloscope. Condenser resistance combinations 1292, 1293, 1294, 1295, 1296 and 1297 are decoupling filters which prevent the signals impressed on the intensity grids of the oscilloscopes from entering the power supply. The vertical deflection plates of azimuth oscilloscope 1280 are connected to the azimuth receiver through a video amplifier 1298.

The functioning of the lower channel appearing in Fig. 12 may be summarized as follows: the positive rectangular voltage pulse generated by the line pulse modulator 908 is impressed in series on the isolating amplifier and the delayed multivibrator circuit, the latter controlling the generation of the saw-tooth wave used for producing horizontal sweeps in the range, azimuth, and elevation oscilloscopes, and also for controlling the intensity grid of the range oscilloscope so that the beam reaches the oscilloscope screen only during the linear portion of the saw-tooth wave. The same rectangular wave generated by the delayed multivibrator, in combination with the output of the notch shaping amplifying tube T—19, is used for controlling the intensity grids of the azimuth and elevation oscilloscopes, and depending upon the amplitude of these rectangular waves, either the entire range field or only the desired echo signal may be reproduced on the screen of the range oscilloscope.

With the exception of the modifications which have been described, the operation of the automatic ranger otherwise does not differ from its operation when it is connected to the synchronous system illustrated in Fig. 1. While in Fig. 1 the differential gear is connected to the range unit phase shifter 28, in Figs. 9 and 12 the differential gear is connected by means of shaft 950 to the range index generator 918 or, more specifically, to the grid potentiometer arm 1220 in Fig. 12, and it is this potentiometer that is calibrated so that the range reading either in miles or yards, or any other linear units, may be directly obtained by reading the scale of this potentiometer when the desired echo signal is placed in notch 1001, Fig. 10. Just as in the case of Figs. 1 and 2, the automatic ranger is provided with the manual control motor switches 954 so that the automatic ranger may be connected and disconnected from the radio locator at any desired instant. As in the case of Figs. 1 and 2, the "Manual-Automatic" operation previously described may be obtained which enables one in the synchronous system to adjust the setting of the grid potentiometer resistor 1216 and its arm 1220 by means of the constant speed motor 956.

*Automatic tracker for the self-synchronous system.*—Referring now to Fig. 13 which is a schematic diagram of the automatic tracker modified so that it could function in connection with the self-synchronous system, the general disposition of the elements in the figure is as follows: square wave amplifier 970, Fig. 9 appears in the upper portion of the diagram; it consists of tubes V—8, V—9, and V—10. The echo selector 932 of Fig. 9 corresponds to a pentode V—5; the channel separator 972 corresponds to a twin triode V—6, the differential amplifier 974 corresponds to a twin triode V—7, and a torque amplifier and motor 974 corresponds to triodes V—11, V—12, an "Amplidyne" unit 1326, and a reversible direct current motor 1336. Square wave amplifier 940 is connected over a conductor 1301 to the lobe switcher of either the azimuth or elevation receiver depending upon whether the tracker is the azimuth or the elevation tracker. The connections of the tubes V—8, V—9 and V—10 are of conventional type and need no detailed description. Tube V—8 acts as an isolating amplifier, while tube V—9 is a voltage amplifier tube which is connected to the control grids of twin triode V—10. The outputs of twin triode V—10 consists of two rectangular waves 180° out of phase with respect to each other. These waves are used for keying the channel separator tube V—6 as it will be explained below. Pentode V—5 is connected over a coupling condenser 1310 and conductor 1312 to the output of either the azimuth or the elevation receiver, and all signals appearing in the output of the receiver are impressed on the control grid of this pentode. The transconductance of this pentode is normally equal to zero since its screen grid is connected directly to ground over a resistance 1314. Accordingly, all signals, except the desired echo signal which has been selected by the range operator, are blocked and do not appear in the output circuit of the pentode. The screen grid of V—5 is also connected over a condenser 1251 and a conductor 1247 to an isolating and inverter stage T—33, Fig. 12, the output of which, as it may be recalled from the description of Fig. 12, consists of a series of rectangular voltage pulses, the duration and timing of which coincides with the echo signal selected by the range operator. The positive signal impressed on the screen grid of pentode V—5 changes its transconductance so that it acts substantially as a class B amplifier with respect to the desired echo signal. The selected echo signal is impressed on the cathode of V—6, this cathode being grounded through a cathode resistor 1316. Since the plates of this twin triode are connected to a potential which is slightly below ground through a conductor 1318 and a potentiometer 1320, triode V—6 is normally nonconductive. However, when there is no negative signal impressed on either of the control grids by twin triode V—10 and the cathode is driven to a potential which is considerably below ground potential by the echo signals, either one or the other half of V—6 is rendered conductive. Since keying of triode V—6 is timed so that its stages are rendered alternately conductive simultaneously with the appearance of the lobe components of the selected echo signal, one set of lobe components appears in the output of one triode and another set of lobe components appears in the output of the other triode. These are impressed on integrating condensers 1322 and 1234 which control the conductivities of two direct current amplifiers shown as a twin triode V—7. When the plate currents of both stages of V—7 are equal, no voltage appears across the plates of these amplifiers since with equal conductivities the plate potentials to ground are equal. A potentiometer resistance 1326 is provided which is used for balancing the conductivities of these amplifiers when the potentials across the condensers 1322 and 1324 are equal. A meter 1328 is connected across the plates of V—7, this meter indicating the difference in the conductivities of the twin stages of triodes V—7. Since these conductivities, at the same time, are controlled by the amplitudes of the respective lobe components of the selected echo signal, meter 1328 indicates the degree as well as the direction of the antenna array deviation from its on object position. Therefore, meter 1328 may be used for the so-called "meter tracking" of a moving object. The output of amplifier V—7 is impressed on direct current amplifier tubes V—11 and V—12, the plates of which are connected to differential field coils 1330 and 1332 of a torque amplifier 1334 which may be an "Amplidyne" set or any similar torque amplifying means. The output of this torque amplifying means is connected to a reversible direct current motor 1336 which is connected through a gear box 1338 and shafts 1340 and 1342 to an antenna array 1344 which may be either an azimuth or elevation antenna array depending upon the input signal impressed on the echo selector tube V—5.

As in the case of the automatic ranger the automatic tracker is provided with switches 1350, 1352, 1354 and 1356 which are used for obtaining the "manual-automatic" operation of the automatic tracker. When the switches 1350 and 1352 are open and the switches 1354 and 1356 are closed, the automatic tracker is disconnected, and the tubes V—11 and V—12 may be unbalanced in either direction by revolving a knob (not shown) connected to potentiometer resistances 1357 and 1358 thus producing the "manual-automatic" tracking in either direction. The switches are used for the initial orientation of the antenna arrays and resetting of the system on the echo signal which has been temporarily lost by the automatic ranger.

With the exception of the echo selector tube V—5, the circuits disclosed in Fig. 13 are identical with the circuits disclosed in our patent application Serial No. 478,862 where they and their mode of operation are described more in detail in connection with Figs. 3 and 4 in the above application.

The operation of the self-synchronous radio locator together with the automatic tracker and ranger may be summarized as follows: a line pulse modulator 908, Fig. 9 periodically keys a transmitter 910 which transmits exploratory pulses, the echoes of which are received by the azimuth and elevation receivers 901 and 902. The periodic voltage pulse generated by the line pulse modulator is also used for controlling a delayed multivibrator circuit the output of which controls a saw-tooth oscillator used for generating horizontal sweep voltages of proper duration for the azimuth, elevation and range oscilloscopes. Since the rate of transmitter keying is relatively low, the intensity grids of all oscilloscopes must be controlled so that only the desired portion of the operating cycle is visible on the screens of all oscilloscopes. This is accomplished by combining the rectangular waves generated by several delayed multivibrator circuits so that only the desired echo signal is normally reproduced on the screens of the azimuth and elevation oscilloscopes, and only the horizontal base line corresponding to the range of the radio locator and the signals occurring during this period are reproduced on the screen of the range oscilloscope. The range measurements are performed by varying the grid potentiometer setting of the precision delayed multivibrator circuit which controls the timing, through another delayed multivibrator, of the rectangular notch voltage appearing on the screen of the range oscilloscope. By varying the potentiometer setting the notch may be positioned directly under any desired echo signal, and when this is the case, the potentiometer scale reading corresponds to the range distance to the object producing the echo signal.

The notch generated by the multivibrator circuits is used in the automatic ranger for controlling the generation of the time-discriminating pulses, which in turn are used for constantly controlling the potentiometer setting in the precision delayed multivibrator circuit so as to keep the desired echo signal constantly centered within the notch. This results in the automatic range determination.

The width of the notch signal is adjusted so that it is equal to or slightly wider than the width of the pulse generated by the line pulse modulator. Therefore, this pulse is used for selecting that same echo signal in the automatic tracker which has been selected by the range operator. The selected echo consists of alternate series of lobe components since the azimuth and elevation receivers are of the double-tracking type. The lobe components of the selected echo are separated and their relative amplitudes compared in two parallel channels, the differential output of which is utilized through the torque amplifier and the reversible motor for the automatic tracking of the moving object producing the selected echo.

The advantages of the automatic operation of the radio locators has been already pointed throughout the specification, and summarized in columns 22 to 24, and, therefore, needs no additional repetition here.

It is believed that the construction and operation of our automatic systems as well as the many advantages thereof will be apparent from the foregoing description. It will, therefore, be apparent that while we have shown and described our invention in several preferred forms, many changes and modifications may be made without departing from the spirit of our invention as sought to be defined in the following claims.

We claim:

1. In a radio pulse echo locating system having means to radiate short pulses at successive intervals and to receive echoes from a remote object, means to generate secondary pulses having a rectangular wave form, a duration of the order of said radiated pulses, and a variable delay from said radiated pulses substantially equal to the time an echo from a selected object would be delayed, differentiating and shaping means to convert said secondary pulses to equal positive and negative pulses of rectangular wave form and similar duration corresponding to the edges of said secondary pulses, and ranging means including two channels providing outputs normally non-responsive to said echoes, one rendered responsive to said echoes by said positive pulses and one by said negative pulses, and means responsive to the difference in the channel outputs to correct said variable delay until such difference is eliminated.

2. In a radio pulse echo locating system having means to radiate short pulses at successive intervals and to receive echoes from a remote object, means to generate secondary pulses having a rectangular wave form, a variable duration of the order of said radiated pulses, and a variable delay from said radiated pulses substantially equal to the time an echo from a selected object would be delayed, differentiating and shaping means to convert said secondary pulses to equal positive and negative pulses of rectangular wave form and similar fixed duration corresponding to the edges of said secondary pulses, and ranging means including two channels providing outputs normally non-responsive to said echoes, one rendered responsive to said echoes by said positive pulses and one by said negative pulses, and means responsive to the difference in the channel outputs to correct said variable delay until such difference is eliminated, said variable duration providing a variable spacing of said positive and negative pulses to vary the sensitivity.

3. In a radio pulse echo locating system having means to radiate short pulses at successive intervals and to receive echoes from a remote object, oscilloscope tubes for determination of range and direction, each oscilloscope tube having an intensity control, a time sweep control corresponding to range, and a deflection control responsive to receipt of echoes, means to generate rectangular waves of duration equal to the maximum range of the system and synchronized to start substantially at the time of the radiated pulses, means to generate rectangular pulses of duration of the order of the radiated pulses and synchronized to occur at the time of return of an echo from the selected object, means to impress said generated pulse on one of the controls of said oscilloscope tube used to determine range, for identifying the selected echo, means to impress said rectangular wave on the intensity control of said oscilloscope tube used for determining range, mixer means to impress said rectangular wave and pulse in independently variable magnitudes on said intensity control of said oscilloscope tube used to determine direction, whereby, depending on the relative amplitudes, only the selected echo signal or the entire range field is made visible on the oscilloscope tube used to determine direction.

WILLIAM A. HUBER.
WILLIAM T. POPE, Jr.

REFERENCES CITED

The following references are of record in the file of this patent:

UNITED STATES PATENTS

| Number | Name | Date |
|---|---|---|
| 1,593,343 | Merrill | July 20, 1926 |
| 1,828,948 | Rossman | Oct. 27, 1931 |
| 2,189,549 | Hershberger | Feb. 6, 1940 |
| 2,227,598 | Lyman et al. | Jan. 7, 1941 |
| 2,403,975 | Graham | July 16, 1946 |
| 2,416,088 | Deerhake | Feb. 18, 1947 |
| 2,421,020 | Earp | May 27, 1947 |
| 2,422,074 | Bond | June 10, 1947 |
| 2,445,584 | Ramo | July 20, 1948 |